United States Patent
Kadur et al.

(10) Patent No.: US 9,659,289 B2
(45) Date of Patent: May 23, 2017

(54) CUSTOMER TOUCH POINT FOR REAL TIME SHARING OF TRANSACTION DATA BETWEEN DIFFERENT CUSTOMER INTERACTION CHANNELS

(71) Applicant: CELLCO PARTNERSHIP, Basking Ridge, NJ (US)

(72) Inventors: Vani R. Kadur, Belle Mead, NJ (US); Arvindeep Singh Anchala, Cumming, GA (US)

(73) Assignee: Cellco Partnership, Basking Ridge, NJ (US)

(*) Notice: Subject to any disclaimer, the term of this patent is extended or adjusted under 35 U.S.C. 154(b) by 678 days.

(21) Appl. No.: 13/728,714

(22) Filed: Dec. 27, 2012

(65) Prior Publication Data

US 2013/0185196 A1    Jul. 18, 2013

Related U.S. Application Data

(63) Continuation-in-part of application No. 13/352,893, filed on Jan. 18, 2012.

(51) Int. Cl.
| | | |
|---|---|---|
| *G06Q 30/06* | (2012.01) | |
| *G06Q 20/22* | (2012.01) | |
| *G06Q 20/02* | (2012.01) | |
| *G06Q 20/12* | (2012.01) | |
| *G06Q 20/38* | (2012.01) | |
| *G06Q 20/40* | (2012.01) | |
| *G06Q 30/08* | (2012.01) | |

(52) U.S. Cl.
CPC ........... *G06Q 20/22* (2013.01); *G06Q 20/027* (2013.01); *G06Q 20/12* (2013.01); *G06Q 20/389* (2013.01); *G06Q 20/401* (2013.01)

(58) Field of Classification Search
CPC ............................. G06Q 30/06; G06Q 30/08
USPC ................................................ 705/26.1, 27.1
See application file for complete search history.

(56) References Cited

U.S. PATENT DOCUMENTS

| | | |
|---|---|---|
| 6,381,582 B1 | 4/2002 | Walker et al. |
| 7,243,078 B1 | 7/2007 | Lewis-Hawkins |
| 7,720,723 B2 | 5/2010 | Dicker et al. |
| 8,265,261 B1 | 9/2012 | Adamson et al. |
| 8,761,372 B1 | 6/2014 | Adamson et al. |
| 8,874,636 B2 | 10/2014 | Tuchman et al. |
| 2002/0072974 A1 | 6/2002 | Pugliese et al. |
| 2003/0084306 A1 | 5/2003 | Abburi et al. |
| 2003/0105682 A1 | 6/2003 | Dicker et al. |
| 2005/0021417 A1* | 1/2005 | Kassan ............. G06Q 30/0203 705/14.51 |
| 2010/0125492 A1 | 5/2010 | Lin et al. |

(Continued)

OTHER PUBLICATIONS

Bidwell, Percy W, Imports in the American Economy, Foreign Affairs (pre-1986); Oct. 1945; 24, 000001; ProQuest Central, pp. 85-98, total 14 pages.*

(Continued)

*Primary Examiner* — James Zurita

(57) ABSTRACT

Techniques and equipment for enabling a cross-channel real time awareness framework for capturing and sharing transaction data in real time for a user via an interface of a channel of an enterprise are disclosed. The captured transaction data are made accessible to other channels of the enterprise for processing transactions initiated by the user via an interface of the one of the other channels.

20 Claims, 9 Drawing Sheets

(56) References Cited

U.S. PATENT DOCUMENTS

2011/0258049 A1\* 10/2011 Ramer et al. .............. 705/14.66
2013/0173687 A1 7/2013 Tuchman et al.
2013/0185196 A1 7/2013 Kadur et al.

OTHER PUBLICATIONS

Classified ad 4—no title (May 29, 1852. New York Daily Times (1851-1857).\*
Martin, Thomas, Ancient Greece: from prehistoric to Hellenistic Times, Yale University, 1996. pp. 11-12, total 2 pages.\*
Entire Prosecution of U.S. Appl. No. 13/352,893, to Arvindeep Singh Anchala, filed Jan. 18, 2012, entitled "Cross Channel Real Time Awareness Framework".

\* cited by examiner

CUSTOMER TOUCH POINT FOR REAL TIME SHARING OF TRANSACTION DATA BETWEEN DIFFERENT CUSTOMER INTERACTION CHANNELS

RELATED APPLICATIONS

This application is a continuation in part and claims the benefit of U.S. application Ser. No. 13/352,893, filed on Jan. 18, 2012, which is incorporated herein by reference in its entirety.

BACKGROUND

An enterprise offering goods and/or services to consumers will often operate systems providing different channels and user interfaces, for enterprise interaction with consumers. The interactive channels may be for initial sales to new customers, sales to existing customers, service to existing customers, etc. For example, an enterprise offering mobile communication devices and services to the public may operate systems and provide various interactive channels for customer sales and services including, but not limited to, an on-line Web Channel for consumers, an in-store Retail Channel; an interactive voice response (IVR) Channel; a live operator Tele Sales Channel; a Handset Channel for access via mobile device as well as others such as an automated Kiosk Channel, etc.

These various consumer interaction channels for an enterprise organization generally use disparate systems and provide different interfaces from the consumers' perspective. Consequently, it is difficult to capture information about a customer's activity or transaction via one such channel within the enterprise organization and use this information in another sales channel. The lack of awareness of customer activity between the different channels of the enterprise generally leads to poor allocation of enterprise resources, missed sales opportunities and a decrease in customer satisfaction levels. Typically, a user's interactions with a given enterprise channel are considered relevant for transactions initiated only in that channel, regardless of whether or not such interactions are related to a transaction initiated previously by the same user in a different channel. Consequently, user experience may suffer if users must repeat the same transaction-related information in multiple channels of the same organization. If users must interact with disparate enterprise systems associated with different enterprise channels, they may become discouraged from interacting altogether with the different channels of the enterprise.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
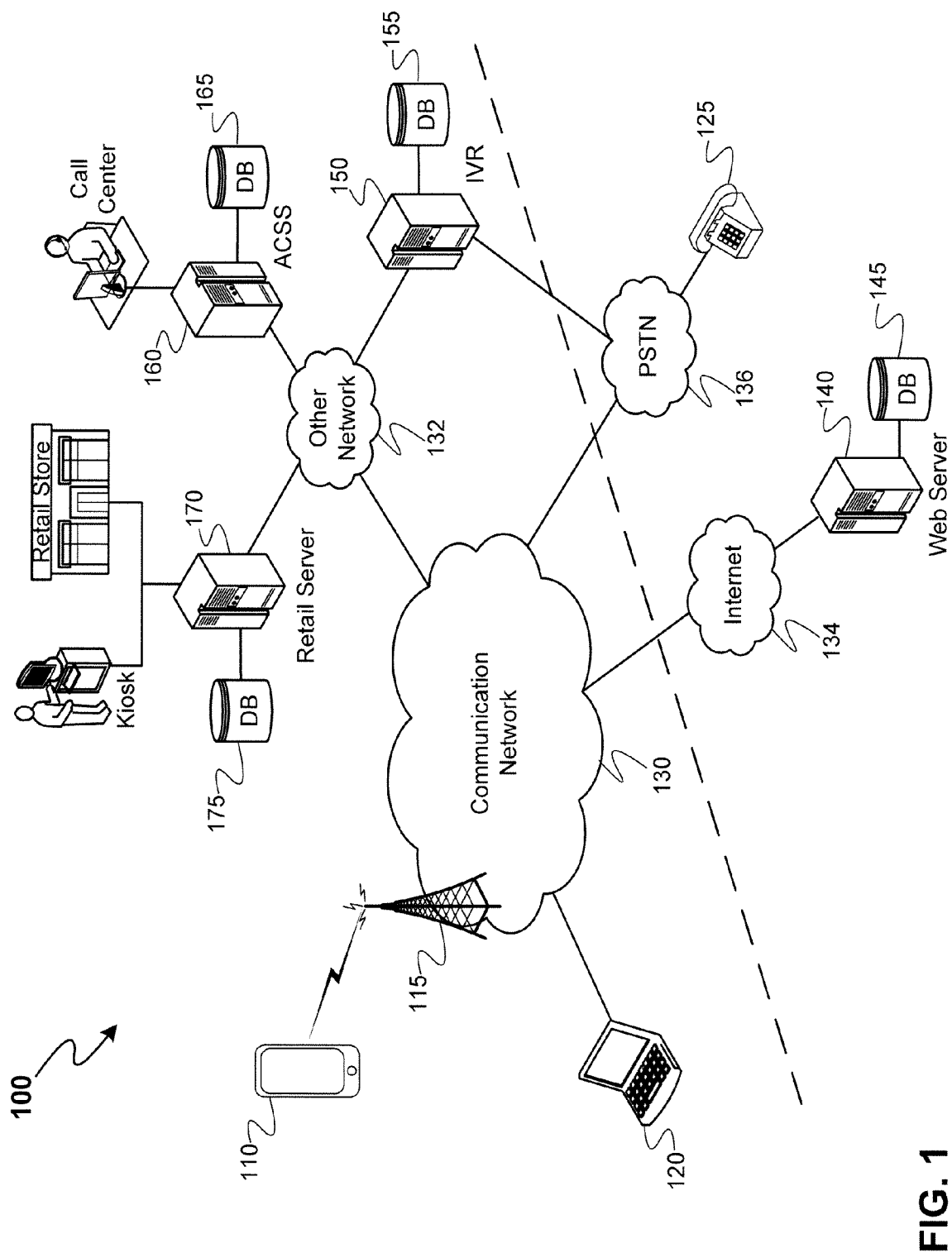
FIG. 1 illustrates an exemplary enterprise network environment offering a variety of communication services, including communications for a real time awareness framework between different customer interaction channels of the enterprise network environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The drawings and discussions below relate to examples of techniques and equipment for enabling a centralized user interaction framework or subsystem for tracking and sharing user transaction data in real time across the various channels of an enterprise network environment. Several examples will be described below in the context of a business enterprise having various interactive sales channels for providing products or services to users who are existing or new customers of the enterprise. However, it should be noted that the techniques disclosed herein are not intended to be limited thereto and that these techniques may be applied to different types of channels of an enterprise for facilitating user interactions with the enterprise, including those for non-commercial purposes as well.

As will be described in further detail below, the cross-channel real time awareness framework enables such disparate systems to monitor and share transaction data associated with a user's/customer's activities related to the enterprise in substantially real time across the different channels of the enterprise. The capability to track a user's activities across different channels of an enterprise enables the organization as a whole to become better aware of new opportunities to improve user experience and also, to offer the user/customer new products or services based on the user's previous actions and transaction history in any of the channels of the enterprise.

The terms "interface" or "user interface" are used interchangeably herein to refer broadly and inclusively to any form of interactive communication to and from a user (or customer) of an enterprise organization. Such a user interface may include, for example and without limitation, an interactive voice response interface (e.g., an automated response system with speech-to-text transcription capabilities), an automated digital or electronic interface including interactive visual elements, and a live person interface (e.g., a customer service representative in a call center). As will be described in further detail below, an example of such an automated digital or electronic interface may include, but is not limited to, a web portal or other interactive visual interface provided via one or more web pages or screens loaded from a server through a communication network to the user's web browser or other application on the user's device. Another example of such an automated interface may include an automated speech-to-text transcription tool for transcribing the user's voice responses during a live-person chat or conversation with a customer service or sales representative of the enterprise organization. Further, it should be noted that any adjustment or modification to such a user interface may involve modification(s) to front-end interface components of an enterprise system, to back-end components or operations of such system, or to both. As such, a different user experience may be provided to the user by modifying one or more such components or operations associated with either front-end or back-end processes or systems in an enterprise network environment.

The terms "channel," "interactive channel" and "customer interaction channel" are used interchangeably herein to refer to a branch or division of an enterprise organization through which a user may communicate with the enterprise with respect to one or more products or services offered by the enterprise or information related to such products or services. As noted above, the enterprise may be a commercial or non-commercial enterprise, and the customer interaction channels of the enterprise thus may be used for either commercial or non-commercial purposes, depending on the particular type of enterprise organization. In an example, a business or commercial enterprise may include different channels for retail or sales purposes (or "sales channels") and other channels for customer service and support purposes. Examples of the interactive channels for a business enterprise may include, but are not limited to, an on-line Web channel for retail consumers, an in-store retail channel, an interactive voice response (IVR) channel (e.g., as will be described in further detail below with respect to FIG. 1), a customer service channel including a call center, a live-person chat channel for customer service and telephone sales, a handset channel for access via a mobile device, and automated channels including, for example, an automated Kiosk channel and an automated chat channel (e.g., involving pre-defined answers to frequently asked questions, without any live-person interaction). For example, each of the different sales or interactive channels within such a business enterprise may be associated with a different system for providing an interface for self-service transactions to various users and managing user data. Further, each of these channels may provide its own interface for enabling the user to initiate one or more transactions associated with products or services offered by the enterprise.

As used herein, the term "transaction" may refer to an individual action or a series of individual actions that are taken by the user while interacting with an interface provided by a channel of the enterprise. A single transaction may include, for example, a sequence of steps that are to be completed by the user during an interactive process flow provided to the user via the interface of the enterprise channel. As such, this transaction also may be referred to as a "multi-step transaction." Examples of different types of transactions may include, but are not limited to, consumer or retail transactions involving the purchase of products or services offered for sale by a commercial enterprise, user account transactions involving administrative actions (e.g., changing or updating options or details associated with a user account or profile), and transactions involving user requests for information associated with new products or services offered by the enterprise (e.g., browsing information provided to the user via one or more web pages in a Web channel of the enterprise).

Reference now is made in detail to the examples illustrated in the accompanying drawings and discussed below. An example enterprise network environment 100 is described initially with respect to FIG. 1. By way of illustration, the enterprise in our example operates a mobile communication network and offers its users and potential users (i.e., customers) communication services as well as other services marketed and/or provided through the network. For example, the communication network 130 may be implemented as a network conforming to one or more well-known wireless networking standards and protocols. Examples of such standards include, but are not limited to, the code division multiple access (CDMA) IS-95 standard, the 3rd Generation Partnership Project (3GPP) wireless IP network standard, the 3rd Generation Partnership Project 2 (3GPP2) wireless IP network standard, the Evolution Data Optimized (EVDO) standard, the Global System for Mobile (GSM) communication standard, the time division multiple access (TDMA) standard or other standards used for public mobile wireless communications.

However, it should be noted that the cross-channel real time awareness framework as described herein is not intended to be limited to mobile communication networks and therefore, may be applied to interactive communication channels of other types of enterprise organizations. As described above, such channels may be designated for retail sales, customer service, or other customer support purposes. Further, the channels can be used to conduct sales or service transactions for new users or existing users having accounts with the enterprise. It should also be noted that such communication channels may be used for commercial or non-commercial purposes, depending on the particular enterprise organization. Hence, the illustrated enterprise environment provides a variety of communication services between different user devices and enterprise servers, including communications for tracking user transaction data across different channels of an enterprise in a real time awareness framework.

In the example illustrated in FIG. 1, enterprise network environment 100 includes a client device 110 and a client device 120, which communicate request messages to one or more servers 140, 150, 160 and 170 through a communication network 130, which can include, for example, one or more interconnected networks such as a network 132 and the Internet 134. Also, as shown in FIG. 1, servers 140, 150, 160 and 170 are each communicatively coupled to a database 145, a database 155, a database 165 and a database 175, respectively. In an example, servers 140, 150. 160 and 170 including their respective databases 145, 155, 165 and 175 are each associated with a different interactive channel of the enterprise. Further, each server-database pairing may be implemented using a different enterprise system within the enterprise network environment 100 for providing user interaction services for its respective interactive channel.

As shown in the example of FIG. 1, server 140 may be a web server for an interactive Web or online channel of the enterprise. As will be described in further detail below, servers 150 and 160 may represent servers in an Interactive Voice Response (IVR) system and an Automated Customer Support System (ACSS) arranged at a call center, respectively. Server 170 may be a retail server for enabling retail transactions associated with physical sales channels including, but not limited to, an automated kiosk channel with various kiosks for users at different physical locations and/or a physical retail store channel of the enterprise. Further, each of databases 145, 155, 165 and 175 may be accessible to any of servers 140, 150, 160 and 170 for accessing user transaction data across the various channels, as will be described in further detail below, via communication network 130 (including network 132). In an example, any of servers 140, 150, 160 or 170 or other server (not shown) may function as a data server for a data warehouse system of the enterprise network environment 100. Such a data warehouse may be used by enterprise network environment 100, for example, to facilitate the real time storage, processing, and sharing of user transaction data across the various channels of the enterprise.

Communication network 130 of enterprise network environment 100 facilitates communications between various types of clients and at least one server for purposes of client access to the functionality of a service hosted at the server. Such functionality can be implemented in the form of a self-service transaction accessible to the client. In addition, network 130 further supports communications for devices that do not execute client applications or participate in any particular service hosted at any of servers 140. Network 130 can thus be any network or combination of networks in an overall communication network for transmitting voice and types of data communications between various devices associated with the communication network. Network 130 can include, but is not limited to, a wired (e.g., Ethernet) or a wireless (e.g., Wi-Fi or 4G) network. In addition, network 130 can include a local area network, medium area network, and/or wide area network. Network 130 can support protocols and technology including, but not limited to, Internet or World Wide Web protocols and communication services. Intermediate network routers, gateways, or servers may be provided between components of enterprise network environment 100 as may be necessary depending upon a particular network implementation or computing environment.

In an example, communication network 130 allows users of client devices 110 and 120 (and other devices not shown) to initiate and receive telephone calls to each other as well as through the public switched telephone network or "PSTN" 136 and a telephone station 125 connected to the PSTN. Additionally, network 130 enables users to request various data services via the Internet 134, such as downloads, web browsing, email, and other similar types of web services. Such data services are hosted at one or more application servers (e.g., web server 140) associated with network 130. As communication network 130 of enterprise network environment 100 can be implemented using a number of interconnected networks, the overall network for the enterprise environment may include a number of radio access networks (RANs). Such radio access networks can also include a traffic network for transferring user communications and data, e.g., from mobile device 110 to base station 115 and other elements with or through which mobile device 110 communicates. The network can also include other elements that support functionality other than device-to-device media transfer services such as messaging service messages and voice communications. Specific elements of communication network 130 for carrying the voice and data traffic and for controlling various aspects of the calls or sessions are omitted here for simplicity.

The client devices 110 and 120 are examples of two types of client devices that may be used for communicating request messages to a web service hosted at one or more of server(s) 140. In the example shown in FIG. 1, client device 110 is a mobile station or device for accessing mobile wireless communications services through communication network 130, for example, via one or more base stations (BSs) 115. Thus, client device 110 can be any type of mobile computing device capable of sending and receiving voice and data communications over one or more networks. Examples of such mobile computing devices include, but are not limited to, portable handsets, smart-phones, tablet computers, and personal digital assistants. Similarly, client device 120 can be any type of general purpose computing device, such as a desktop personal computer. An exemplary implementation of such client devices capable of implementing a client will be described further below with respect to FIG. 10.

While the example in FIG. 1 shows only two client devices 110 and 120, enterprise network environment 100 can be used to facilitate data communications for additional devices (not shown) over communication network 130. Similarly, enterprise network environment 100 can include other servers in addition to servers 140, 150, 160 and 170 for receiving request messages from one or more of the client devices. Furthermore, the present techniques may be implemented in communication network 130 using any of a variety of available communication networks and/or on any type of computing device compatible with such networks. As such, FIG. 1 is used herein to provide only a very simplified example of a few relevant elements of enterprise network environment 100 and network 130, for purposes of discussion and ease of explanation.

In an example, a user of a mobile device (e.g., client device 110) can dial a predetermined number, such as a customer service number, to reach an Interactive Voice Response system (IVR) 150, as noted above. IVR 150 may provide one or more selected items of information to the user (also referred to as "the caller" in this example), or route the call to a call center per the user's request. Once the call reaches the call center, an agent speaks to the customer to resolve her need. IVR 150 interacts with the caller by collecting the caller's inputs entered using a telephone keypad and responding with voice. For example, when the caller dials a customer service number, IVR 150 may provide an automated interface for greeting the caller with audio content and guiding the user via audio prompts in a step-by-step transaction. Each step of this transaction provides the caller with various options (e.g., pressing different input keys to request the user's account information or some other information or service provided by the enterprise). In response to user input (e.g., when the user presses a key on a keypad of the device), the IVR 150 may respond with an audio response based on the particular input (e.g., particular key that was pressed by the user).

Based on user input via the interface provided by IVR 150, a user's call may be transferred to a call center (i.e., a different interactive channel) to enable the caller to speak with a live person. While a call is delivered to the call center, one business objective is on completing the call as quickly as possible. This is typically measured by the average handling time (AHT) for each live agent at the call center. In order to help the agent to meet this objective, information collected in the IVR system is delivered to the live agent. In an example, each menu and option provided by IVR 150 may be associated with a unique code for the particular menu and option. When a caller interacts with the IVR system, the caller's actions can be identified by activity identifications (IDs) that represent codes of the menus and options selected by the caller.

An automated customer support system (ACSS) 160 arranged at the call center can translate user actions/activities into a readable text which is then displayed by the agent's desktop terminal when the agent communicates with the caller. For example, the automated customer service interface provided by the ACSS may allow the user to initiate a transaction by performing a series of actions or steps. Further, each action may be associated with an action or activity ID that uniquely identifies each action performed by the user, including the last set of actions of the user for a transaction. This may include any transaction that was abandoned by the user prior to completion. As described herein, a transaction having multiple steps that are generally performed by a user may be referred to as being "abandoned" or "incomplete" when, for example, the user cancels or discontinues the transaction after performing or completing one or more actions/steps but prior to completing the final step or the entire transaction as a whole.

In an example, the ACSS 160 translates transaction information related to the user's actions in the channel into human or machine readable language indicating the last location in the user process flow of IVR 150 that was reached by the caller before the call was transferred to the call center. In an example, the user activity or action data captured by IVR 150 and/or ACSS 160 for each transaction may be stored in database 155 and database 165, respectively. Alternatively, this information may be stored in a single database, for example, either database 155 or database 165, or at database 175 of the data warehouse system of the enterprise network environment 100.

Figure 2:
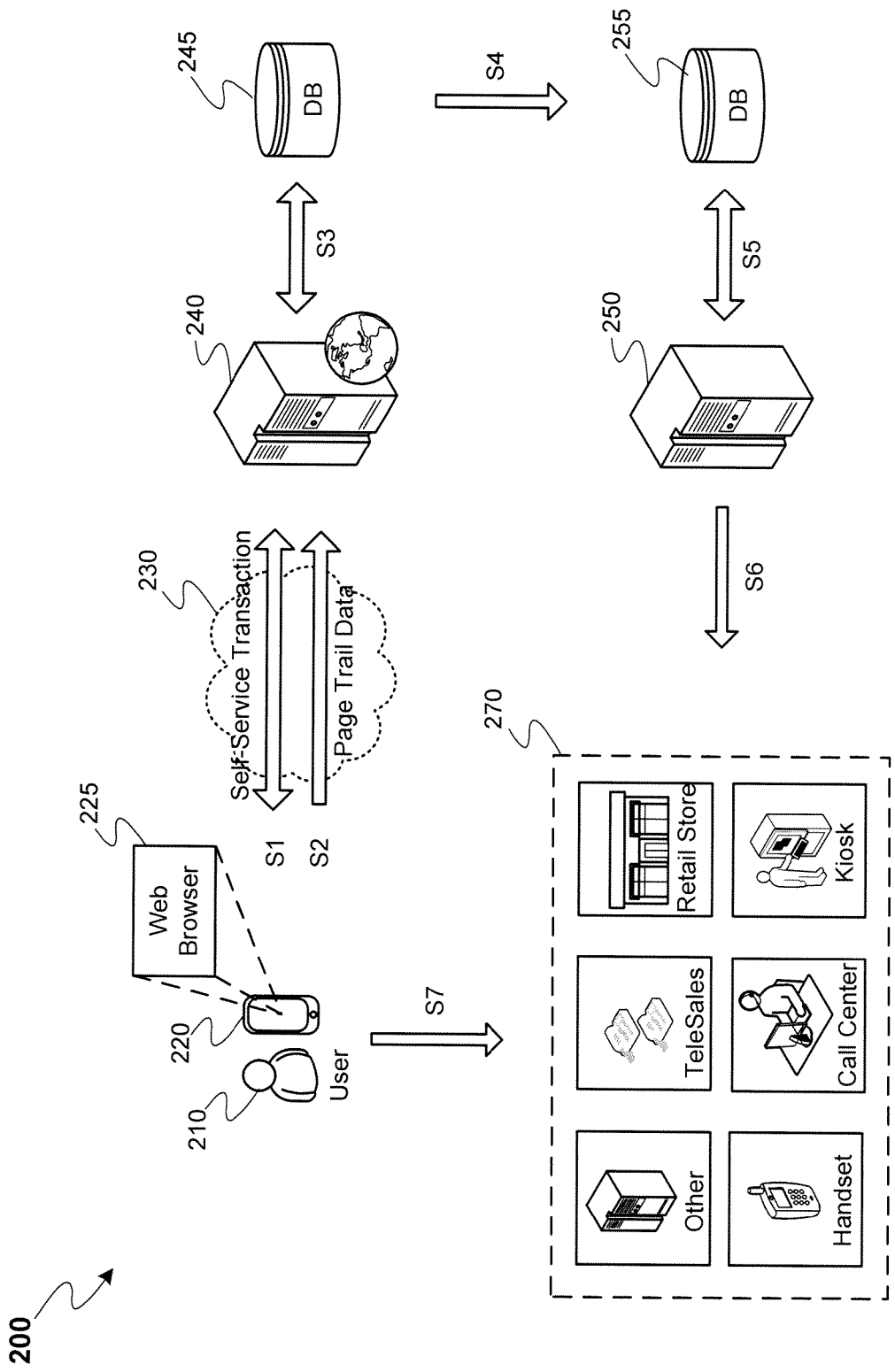
FIG. 2 is a block diagram illustrating an exemplary data flow for implementing a real time awareness framework between different customer interaction channels of an enterprise network environment.

Reference is now made to FIG. 2 in order to further illustrate the various operations performed by different system components in implementing a real time awareness framework across multiple interactive channels of an enterprise, as described above. FIG. 2 is a block diagram illustrating an exemplary communication or data flow for implementing a real time awareness framework between different interactive channels of an enterprise network environment 200. As shown in the example illustrated in FIG. 2, enterprise network environment 200 includes a user 210, a user device 220 executing a web browser 225, a network 230, a server 240, a database 245, a server 250 and a database 255. Also, as shown in FIG. 2, block 270 represents some of the different systems within the enterprise network environment 200 corresponding to various interactive channels of the enterprise.

As will be described in further detail below, each of server 240, database 245, server 250 and database 255 are configured to interface with various internal systems within enterprise environment 200. For example, such internal systems may correspond to each of the sales or customer service channels within the organization, as described previously. Further, each of these devices may be configured to interface with these enterprise systems on an individual basis for receiving transaction data related to user 210 and other users of the enterprise. Alternatively, transaction data corresponding to the various users may be compiled at a centralized database (not shown) for real time monitoring transaction data associated with user 210 and the other users of the enterprise. Further, each enterprise user or customer may be identified based on a unique global identifier.

For ease of explanation, enterprise network environment 200 will be described with reference to one or more of the components in enterprise network environment 100 of FIG. 1, as described above. However, enterprise network environment 200 is not intended to be limited thereto. Thus, for example, user device 220 may be implemented using device 110 or device 120 of enterprise network environment 100, as described above. Similarly, server 240, database 245, server 260 and database 265 may be implemented using, for example, server 140, database 145, server 160 and database 165, respectively, of enterprise network environment 100, as described above. Also, network 230 may be implemented using network 130 of enterprise network environment 100, as described above. Like the description provided above for enterprise network environment 100 of FIG. 1, for ease of explanation, enterprise network environment 200 will be described in the context of a commercial business enterprise having different types of interactive channels including, for example, sales/retail channels and customer service channels. However, enterprise network environment 200 is not intended to be limited to commercial or business enterprises or to retail or customer service channels.

For purposes of this example and the discussion below, enterprise network environment 200 will be described with reference to a Web or online sales channel of the business enterprise as a first channel in which a user/customer of the enterprise initiates a transaction for a product or service. In addition, enterprise environment 200 will be described with reference to a call center or automated customer service channel (e.g., IVR) of the enterprise as a second channel in which the user initiates a second transaction, e.g., for either the same or different product or service. Accordingly, an automated service interface for such a Web sales channel may be implemented using an internal system of enterprise environment 200 that includes server 240 and database 245, as will be described in further detail below. Similarly, server 250 and database 255 may be associated with a different system, such as that of IVR 150 and database 155 of FIG. 1, as described above, for implementing an automated interface for customer service and support in an IVR channel within enterprise network environment 200. Thus, the second transaction may be initiated using any telephone device, including a traditional landline telephone. For example, the user may place a call to the call center, and the call may be answered by an automated IVR system before being transferred to a live customer service representative, as previously described. However, it is noted that the cross-channel techniques and real time awareness framework as disclosed herein are not intended to be limited to only these channels and are applicable to any/all of the various channels of an enterprise.

Like enterprise network environment 100 of FIG. 1, as described above, enterprise network environment 200 of FIG. 2 can be used to provide a variety of communications, including communications for real time tracking of information related to a user's interactions across different interactive channels of an enterprise in a cross-channel real time awareness framework. In an example, user device 220 is configured to execute web browser 225 or other client application for communicating with on one or more of web servers 240 through network(s) 230. Further, server(s) 240 can be a web server that is configured to provide the user 210 at device 220 a user interface for initiating automated or self-service transactions via the web browser 225 through a local area network or wide area network such as the Internet. For example, the self-service transactions may be associated with a Web or online retail sales channel of a business enterprise, as noted above. Also, the transactions may be for the purchase of one or more products or services offered to consumers by the business enterprise.

In the example shown in FIG. 2, user 210 using user device 220 initiates a self-service transaction (S1) related to products or services offered by the enterprise via an automated service interface for an interactive Web or online sales channel of the enterprise. In an example, the user-initiated transaction involves multiple steps or actions that are to be performed by user 210 in order to complete the transaction. These steps or actions may be presented to user 210 as a user process flow involving a series of web pages or virtual frames displayed in web browser 225 or other application that is executing at user device 220. For example, each page or frame may correspond to a different step or action in a series of steps/actions in a path to transaction completion.

Figure 3:
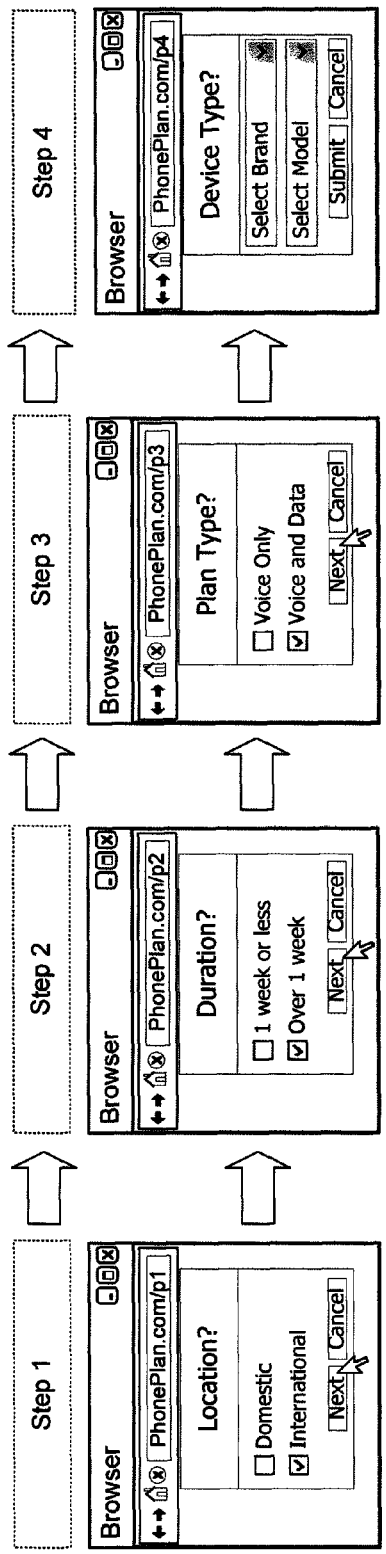
FIG. 3 illustrates an exemplary automated interface for a self-service transaction in an interactive Web channel in which the steps of the transaction are presented as a series of web pages loaded within a web browser.

FIG. 3 illustrates an example automated interface for a self-service transaction in an interactive Web channel in which the steps of the transaction are presented to a user as a series of web pages or frames or views within a single web page that are loaded in a web browser (e.g., web browser 225 of FIG. 2, as described above). However, it should be noted that the techniques described herein with respect to user interaction via an automated service interface for transactions in an interactive channel of an enterprise are not limited to web pages or web browsers. For example, the automated interface of the channel may be provided in the form of one or more virtual screens or windows within a separate client application that is associated with the enterprise and executing at the user device. Such an application may be provided, for example, by the enterprise or a third-party application provider associated with the enterprise.

In the example automated or self-service transaction shown in FIG. 3, each web page in a series of web pages corresponds to a different step related to a transaction for an online trip planner utility that may be offered by, for example, a wireless carrier or operator of a mobile communication network. For example, the online trip planner in this example may be intended for mobile users or subscribers of the carrier's mobile communication services who would like to receive information and pricing details regarding their available options for international wireless voice or data services during an upcoming trip. As shown in FIG. 3, each page may be displayed using a visual interface having one or more user control elements with which the user can interact (e.g., via a user input device such as a mouse, keyboard or touch-screen display of the user device) for completing each step of the transaction. The user control elements may include navigation button controls for moving between different steps (e.g., proceeding to the next step) or for canceling or discontinuing the transaction at some point prior to completion of the last step. As described above, the transaction may be considered "abandoned" or "incomplete" when, for example, the user cancels or discontinues the transaction after one or more actions/steps are performed or completed but prior to the completion of the final step (i.e., step 4 in the example shown in FIG. 3).

It should be noted that only four pages and steps are shown in FIG. 3 for ease of discussion, and that any number of pages may be used as desired. Moreover, a user's selection of user control elements on one page may cause the automated web interface, in this example, to present to the user a different process flow including additional pages and steps based on the selection. For example, a different process flow with a different set of pages including their own user control elements may be presented for domestic versus international service plans. Each of these plans and process flows may represent, for example, a different transaction in the channel. Thus, the user's selection of one of these options in page 1 controls the subsequent pages displayed to the user.

Referring back to FIG. 2, user 210 may initiate a self-service transaction by operating user device 220 to browse, via web browser 225, to a web page providing an automated service interface of a Web channel of the enterprise, as described above. In response to user input, user device 220 may send one or more transaction requests, e.g., in the form of Hypertext Transfer Protocol (HTTP) request messages via web browser 225 to web server 240 over network 230. Upon receiving these messages from user device 220, web server 240 may send user interface elements and other web page content to enable the user to perform the requested self-service transaction. For example, the information sent by web server 240 for the self-service transaction may include one or more web pages including interactive elements to be loaded into a content area of web browser 225. As web browser 225 and the interactive content received from web server 240 are displayed at user device 220, user 210 may use a touch-screen, keypad or provide some other type of user input functionality of device 220 to interact with the displayed content. Such user interaction may include, for example, text or data entry into one or more user fields displayed in the interface, selection of one or more user options, navigation between different pages or views, or any other operation related to the self-service transaction as provided by the channel.

In an example, transaction data corresponding to the user's 210 interactions or activities related to the interface of the channel are tracked and captured, for example, at each step of a multi-step transaction. As used herein, the term "transaction data" refers to information related to a transaction initiated by a user via an interface of a enterprise channel. Such transaction data may be captured via the interface based on the user's interactions with different user control elements of the interface related to the user-initiated transaction. The captured transaction data may include information identifying the most recent set of actions performed by user 210 in the first channel. For example, the actions of user 210 that are tracked in the channel may be limited to a predetermined time frame, which may be adjusted as desired to ensure that any transaction data that is captured remains relevant for use in enterprise environment 200. For the web channel example of FIG. 2, the captured transaction data may be in the form of page trail data (S2) captured as user 210 interacts with the elements of the web interface provided by web server 240 via web browser 225. For example, the captured page trail data may include a record of user 210's interactions in the channel with respect to the web pages viewed and/or the content items selected by user 210 within each page. In a further example, the captured page trail data may include a record of the user fields within a page for which user 210 provided some kind of input while using the self-service transaction interface of the channel.

As will be described in further detail below, any number of conventional or other techniques, including a combination of different techniques, may be used to collect, store and share this data between the different systems and channels of enterprise environment 200. In an example, each page or screen displayed for the interface (e.g., via web browser 225) is encoded with one or more specialized tags or identifiers corresponding to different user control elements or content items presented to user 210 via the automated interface of the channel. The encoded tags enable the enterprise to track the user's 210 activities with respect to the user interface provided for the channel. Similar to IVR 150 in the example enterprise environment 100 of FIG. 1, as described above, the user's 210 activities or actions with respect to the tagged elements of the web interface provided by web server 240 may be identified using activity or element IDs or codes representing each of the menu options or other user interface elements selected by user 210 when browsing a web page via web browser 225. Further, for purposes of tracking the particular user across the channels of the enterprise, each activity ID may be associated with a global ID for identifying user 210 for subsequent transactions initiated in the same channel or a different channel. For example, the global ID may be a unique numeric value generated by web server 240 based on the user's 210 interactions with the automated interface of the self-service transaction in the Web channel. Additional details regarding the global ID and its use will be described in further detail below. In particular, details related to generating and managing a global ID for a user are described below with respect to FIG. 4.

The tags may be encoded using a combination of conventional or other techniques. In some implementations, the tags may be encoded using markup and/or scripting language elements, e.g., HyperText Markup Language (HTML) or JavaScript. In this example, each tag may be implemented as a JavaScript or other markup element embedded within a web page. For example, when user 210 navigates between different pages or screens or interacts with various page elements in a given web page loaded within web browser 225, browser 225 may be configured to send a beacon signal or message from device 220 to web server 240 over network 230. In an example, a tag encoded in a web page using JavaScript may be preconfigured with a network location address for sending beacon messages to, for example, web server 240 in response to the user's 210 interaction with one or more web pages, as described above. The network location address in this example may correspond to, for example, a Java servlet or other software performing similar functions as the Java servlet executed by web server 240. Similarly, the Java servlet may be preconfigured to intercept the beacon messages sent from the JavaScript tag via web browser 225 over network 230. It should be noted that the network location address for sending beacon messages may correspond to either the same server that served the web page encoded with the tag (e.g., web server 240) or a different server capable of performing the same or similar operations related to intercepting and handling beacon messages, as described herein with respect to web server 240.

As shown in FIG. 2, web server 240 is communicatively coupled to database 245 for storing data corresponding to self-service or automated transactions initiated by user 210 via the aforementioned interface of the Web channel. As described above, page trail data and other transaction data are captured in the channel based on the user's 210 interactions with an interface of the channel at user device 220 (e.g., via web browser 225). In an example, the captured data that is sent from device 220 to web server 240 via network 230 (S2) is stored by web server 240 in database 245 (S3). Further, the captured data may be stored in real time or substantially real time as it is being captured based on the user's 210 interactions with the automated interface of the channel, as described above. The captured data that is stored in database 245 can then be sent to other systems in enterprise environment 200, which correspond to the other channels of the enterprise. As shown by the example of FIG. 2, the captured data may be sent from database 245 to database 255 (S4). Similarly, server 250 and database 255 may be associated with a different system, such as that of IVR 150 and database 155 of FIG. 1, as described above, for implementing an automated interface for customer service and support in an IVR channel within enterprise network environment 200.

As noted above, database 255 and server 250 may be associated with a different system (e.g., IVR 150 and database 155 of FIG. 1, as described above) that provides, for example, an automated interface for customer service and support in an IVR channel within enterprise network environment 200. However, it should be noted that the techniques disclosed herein are not limited to retail channels involving the automated interfaces for Web or telephone sales and support, and that the techniques may be applied across any of the various systems and corresponding channels of an enterprise organization, as described above. Also, as noted above, the real time awareness framework between different channels as described herein is not intended to be limited to commercial enterprises and therefore, may be applied to any type of enterprise organization.

The data transferred from database 245 and now stored in database 255 may be retrieved by server 250 (S5) and shared with one or more other systems 270 (S6) for different channels in the enterprise environment 200, as shown in FIG. 2. As described previously and as shown by the example group of systems 270 in FIG. 2, the channels corresponding to such other systems in enterprise environment 200 may include, but are not limited to, a physical retail store channel, a customer service channel including a call center, a live-person chat channel for customer service and telephone sales, a handset channel for access via a mobile device, and other automated channels including, for example, an automated Kiosk channel and an automated chat channel (e.g., involving pre-defined answers to frequently asked questions, without any live-person interaction). As shown in FIG. 2, user 210 may initiate a subsequent transaction (S7) in any of the channels represented by systems 270, each of which may provide one or more different interfaces with which user 210 may interact. Further, each channel may provide an automated interface, a non-automated interface (e.g., live-person chat) or both.

Alternatively, the transaction data captured for user 210 in any of the channels of the enterprise may be stored within a centralized database (not shown) of enterprise environment 200. For example, the centralized database may be part of a data warehouse system including the database and a data server (also not shown) within enterprise environment 200. The database and data warehouse may be accessible across the different channels and systems of the enterprise environment 200. In an example, transaction data from the different channels of the enterprise system may be delivered to the data warehouse as a daily batch file or streamed in near real time through a communication network of enterprise environment 200. For example, the transaction data stored for user 210 may be retrieved each time user 210 interacts with a channel of the enterprise. To ensure that any transaction data stored for user 210 remains relevant for new transactions initiated by user 210 at a later time, this data may be stored or maintained within the enterprise environment 200 for only a temporary duration (e.g., limited to a few days) that is predetermined by the enterprise as a whole or individually by each channel of the enterprise. The predetermined time period for transactions may be dependent upon the particular channel or transaction. As such, different predetermined time limits for storing transaction data may be prescribed by each enterprise channel for each of the different transactions provided to the user via an interface of that channel. Limiting stored data for user 210 and other users to a predetermined time frame generally helps to conserve storage space in enterprise environment 200.

The captured data for user 210 may include different types of information for identifying user 210 or user device 220 (or the particular web browser 225 executing at device 220) as well as for tracking the user's relevant interactions in association with one or more transactions conducted via the interface of the channel. For example, this information may be tracked for each user session, which may be some predetermined period of use or activity by user 210 via the interface of the channel, as described above. Examples of different types of information that may be sent as part of the beacon message include, but are not limited to, a title or other identifier of the web page or service, a Uniform Resource Locator (URL), a timestamp or session duration, and any other relevant information related to the user transaction in the channel (e.g., items saved to a virtual shopping cart in an interface for online retail channel).

In an example, transaction data may be tracked for user 210 based on a unique identifier that is shared between the different systems of the enterprise channels. For example, such a unique identifier may be associated with the particular user 210, user device 220 and/or web browser 225 and the stored transaction data for user 210 may be based on the user's 210 interactions with one or more channels of the enterprise. Examples of different types of unique identifiers that may be used include, but are not limited to, a telephone number or a user login identifier associated with user 210. These identifiers may be associated with an account for user 210 in the enterprise. An example of another type of unique identifier that may be used for users who may not have any preexisting account or other relationship with the enterprise (e.g., new users) includes a unique offer ID or coupon ID (e.g., a randomly generated ten-digit numeric value or code). In an example of a commercial enterprise offering goods or services, such an offer/coupon ID may be associated with a promotional offer related to a discount for the purchase of a particular good or service. Further, the promotional offer including a unique ID may be generated and provided to a consumer/user of the enterprise based on the consumer/user's interactions in a channel of the enterprise. For example, the consumer (e.g., user 210) may be able to reproduce (e.g., print) a copy of the professional offer or coupon provided in one channel (e.g., online Web channel) and attempt to redeem the offer in another channel (e.g., physical retail store). In an example, the offer/coupon ID may be printed on a hard copy of the promotional offer and thus, may be used in the second channel (e.g., retail store) to track the particular user's actions in the first channel (e.g., online Web channel). As promotional offers generally are limited to being effective for only a short duration, the generated unique offer ID may be valid for only a limited period of time. However, the relevant period of time for the unique offer ID may either be the same as or different from the promotional time period associated with the offer itself. Additionally, the limited period of time associated with the offer/coupon ID may be predetermined by the enterprise for either a particular channel or all channels of the enterprise. Thus, captured transaction data for user 210 and other enterprise users may be stored within one or more systems of enterprise environment 200 in association with, for example, an offer/coupon ID or account information associated with each of the users. The account information for user 210 may include, for example, an account number or other identifier that identifies user 210 and the user's 210 account with the enterprise across the multiple channels of the enterprise. Alternatively, if such user account information is not immediately available when user 210 initiates a transaction in a channel of the enterprise (e.g., user 210 does not provide account login credentials via an interface provided by web server 240), a global ID may be generated and assigned for identifying user 210, user device 220, web browser 225 or other application on user device 220 through which user 210 initiates the relevant transaction request(s).

As noted previously, the global ID may be a unique numeric value generated by web server 240 based on user 210's initiation of a self-service transaction via the automated interface for the channel, as described above. In an example, the global ID is stored at user device 220. For example, the global ID may be stored in a cookie file associated with web browser 225 at user device 220. Further, the global ID in the cookie file may include an expiration date specifying the period of time during which the global ID remains valid for user device 220 or web browser 225 or other application on the device. Once a user (e.g., user 210) of a device (e.g., device 220) identifies herself to the enterprise (e.g., by submitting authentication information), the global ID can be linked to that particular user. Otherwise, the global ID is used as a general way to identify transaction data, including page trail data, initiated from the device or web browser or other application via the automated interface provided by the channel, as described above.

Additionally or alternatively, the global ID may be stored in a central database (not shown), which is accessible across multiple channels within enterprise environment 200. For example, the central database may be part of a data warehouse system of the enterprise environment 200. The global ID may be used to identify user 210 for any subsequent self-service transactions initiated by user 210 in any of the various channels of the enterprise. For example, transaction data corresponding to various users may be compiled at a centralized database for real time monitoring of the last or most recent set of actions for different users or customers of the enterprise organization. As each enterprise user or customer may be identified based on a unique global ID, the use of such a global ID enables a cross-channel awareness framework to be implemented across different enterprise channels corresponding to multiple enterprise systems within enterprise environment 200. Such a cross-channel framework can be used to improve user experience, for example, by providing the enterprise with a snapshot or record of the user's 210 (and other enterprise users') prior relevant interactions with the enterprise, regardless of whether such prior interactions occurred in the same channel or a channel that may be different from a channel with which the user 210 may be interacting currently. Additional details on identifying users of the enterprise will be described in further detail below with respect to FIG. 5.

As the enterprise may have a relatively large number of users making transactions in different channels, additional techniques may be utilized in enterprise environment 200 to further conserve storage space. One example of such a technique that may be used to conserve storage is to store information for only the last page (in addition to any of the above information used to identify the user 210), including the most recent set of actions of user 210 with respect that page, in a multi-page process flow related to the transaction initiated by user 210 in a different channel prior to initiating the current transaction. Using the example automated interface for a multi-step transaction, as shown in FIG. 3 and described above, the last page with which user 210 may have interacted may be page 3 (corresponding to step 3 of the multi-step transaction in this example). As such, only information corresponding to the user's 210 actions with respect to page 3 (e.g., as opposed to pages 1-3) would be stored in enterprise environment 200 (e.g., database 245 or other centralized database, as described above). In this example, any prior transaction information stored for user 210 with respect to this channel may be discarded.

In a further example, transaction data for user 210 may be stored based on a level of interest user 210 exhibited towards a particular service offered by the enterprise. For example, different services may be offered to user 210 via each of the different pages or screens of the automated interface as part of the multi-step transaction of FIG. 3, described above. The level of interest that user 210 may have for one of the services that are offered may be inferred based on, for example, the amount of time user 210 spent on a page or the amount of user 210's interactions with the various elements of a page. Thus, any page for which user 210 spent less time than a predetermined threshold duration of time (e.g., representing a sufficient level of interest for the enterprise channel) may be discarded. Similarly, any page with which user 210 interacted with fewer elements than a predetermined threshold may be discarded. Different levels representing a user's interest in a transaction may be used as desired for different channels and/or different transactions in each channel.

The interest level of user 210 for completing a transaction initiated via an interface of a channel also may be based on relative weight values assigned to the user 210's activities or actions in the channel. A weight value assigned to a user action that is captured by web server 240 (e.g., based on a beacon from web browser 225, as described above) may be based on various factors including, for example, the progress made by user 210 towards completing the multi-step transaction in question. The assigned weight value may be, for example, a simple numeric value in which a higher numeric value represents a relatively greater weight. Referring back to the example multi-step transaction of FIG. 3, each page may be assigned a progressively greater weight value depending on where in the series of pages it appears. Thus, page 2 may be assigned a greater weight than page 1, page 3 assigned a greater weight than pages 1 and 2, and so forth. Using the above-described numeric values to represent different weight assignments, for example, page 3 may be assigned an integer value of '6,' page 2 may be assigned a value of '4' and page 1 a value of '2.' It should be noted that these example integer values are provided only for discussion and that any technique for assigning varying degrees of weights to different pages of an interactive process flow for a transaction may be used as desired. Accordingly, the last page in the multi-page transaction flow would be assigned the greatest relative weight as it may be inferred that a user who reached a later page in an automated interface for a multi-step transaction and thus, completed more steps of the transaction, generally has a relatively higher level of interest than other users who have reached only earlier pages and completed only initial steps of the transaction.

Alternatively, page weights may be assigned based on the needs of the enterprise. For example, the weight assigned to a particular page may be modified, e.g., increased, based on a business need of the organization. Again, referring back to the example of FIG. 3, an enterprise that may be a mobile communications service provider may have a business need to promote international wireless service plans to its mobile subscribers. As such, the weight assigned to pages relating to international service plans (as selected by the user in page 1 of FIG. 3) may be modified, e.g., increased by a predetermined factor or constant value, so as to assign greater weight to these pages. The page weight may be adjusted further based on the length of time the user interacts with a page, where any idle time (e.g., period of prolonged inactivity) may be discounted or ignored.

To ensure that relevant transaction data for a user's activities in a first channel is available for immediate use in a second channel (e.g., in a case where user 210 initiates a second transaction within a few minutes of the first), the transaction data for user 210 is captured and shared across the internal systems for the different channels within enterprise environment 200 in real time or substantially real time. The captured transaction data, including page weight data, can be used to improve customer experience in subsequent channels. Improved customer experience in a second channel (e.g., IVR channel) that may be provided to user 210, in our example, may involve displaying a customized user interface related to a self-service transaction in a first channel (e.g., Web channel). For example, the user interface of the second channel may be customized for user 210 so as to allow user 210 to continue a transaction initiated in the first channel. The transaction initiated in the first channel may be one that user 210 did not complete or abandoned, as described above. Alternatively, user 210 may have completed the transaction but may be interacting with the second channel for additional information regarding the completed transaction. For example, user 210 may be interacting with the interface of the second channel to request confirmation on completion of the transaction from the first channel.

By providing a cross-channel awareness framework that captures and shares information related to a user's activities in one channel with other channels of the enterprise, as described herein, the enterprise is able to deliver an improved user experience by anticipating the user's needs or reason for initiating a subsequent transaction. For example, providing improved user experience to customers of a commercial enterprise may help the enterprise to avoid potential customer service issues and prevent existing customers from discontinuing services or closing their accounts. In the above example of a completed transaction, a customized interface in the second channel (e.g., IVR) may include fewer menu options or prompts, present an option or prompt (or notice) to the user in a more emphasized manner (e.g., rearranged so that it appears first) or present a new option directly related to the previous transaction and that might otherwise not have been presented to the user. If the first transaction in the first channel was, for example, a payment of the user's 210 account charges due for a billing period, then the user interface provided to user 210 in the second channel may include automatically providing confirmation information to user 210 regarding the payment transaction completed in the first channel. Instead of making user 210 go through the entire user process flow or menu of options, a customized flow or menu in the IVR channel may include an automated voice prompt thanking user 210 for the recent payment when the user calls into the IVR system (e.g., provided by server 250). Maintaining the transaction data (e.g., payment, in this example) from the first channel for a relatively short period of time (e.g., period of 3 days), as predetermined by the enterprise channel, helps to ensure any such data retrieved for user 210 remains relevant for the subsequent transaction. In some implementations, each transaction may also be assigned a unique ID. Such a unique transaction ID may be used to identify the source of transaction data by the centralized subsystem. For example, the transaction data from each interactive channel of the enterprise may be stored may be stored in association with a channel-specific ID. Such a channel-specific ID enables the originating channel or source of a user-initiated transaction to be tracked as part of a cross-channel feedback mechanism.

Further, such a cross-channel awareness framework provides the enterprise with potential new transaction (or "upsell") opportunities for additional services that the user 210 may be interested in receiving. As described above, the enterprise may be able to gauge the interest level of user 210 towards a particular service offered by the enterprise based on the user's 210 previous activities (e.g., last page visited, duration on each page, etc.) or transaction history in the channel(s) of the enterprise. Further, by assigning page weights based on organizational needs, as described above, is providing an automated and efficient way for the enterprise to capture metrics related to the activities of particular users or market segments in a channel. The captured metrics may be shared in real time or substantially real time across channels. As will be described in further detail below with respect to FIG. 6, this information also may be used to generate a modified or customized user interface based on the user activities in one or more channels. Further, the shared metrics not only help to improve user experience but also help to provide potential up-sell opportunities related to particular goods or services offered by the enterprise. As the stored metrics and user transaction data can be linked to particular users (e.g., using global IDs and/or account IDs, as described above), the enterprise can use this information to target goods and services offered by the enterprise (including advertisements for these goods and services) to particular users or groups of users across multiple channels of the enterprise.

Also, as will be described in further detail below with respect to FIG. 8, transaction information related to the user's interactions in multiple channels of the enterprise may be used to generate or derive new potential transaction opportunities for the user. In an example, transaction data related to one or more prior transactions initiated by the user through different channels of the enterprise may be captured and stored to a centralized database. Further, the transaction data captured over a predetermined time period for different types of transactions may be analyzed to find correlations amongst seemingly unrelated transactions. In this way, new transaction or up-sell opportunities may be generated based on any correlations that may be found. In some implementations, the captured prior transaction data for a user may be stored based on the type of transaction. In addition, the prior transaction data that may be related to any single transaction initiated by the user also may be stored with a completion status. The completion status of each prior transaction associated with the user allows the centralized user interaction framework for cross-channel awareness of user interactions described herein to identify any transactions that the user initiated in one channel of the enterprise but failed to complete. Accordingly, when the user interacts with an interface of a different channel of the enterprise, the captured data related to the new user interaction may be used to link this interaction with the incomplete transaction and provide the user with the option of completing the transaction via the interface of the current channel with which the user is interacting.

Figure 4:
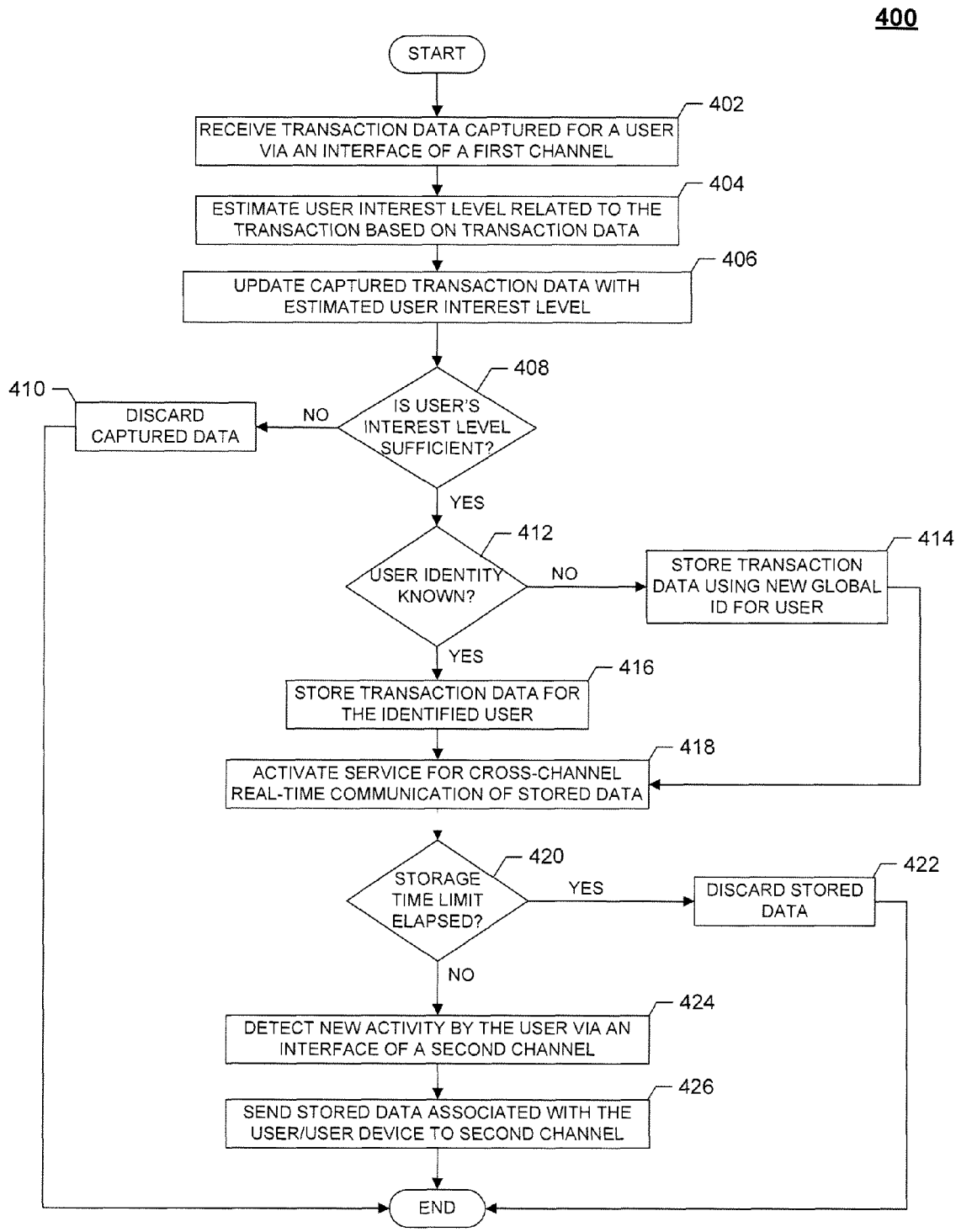
FIG. 4 is a flowchart of an exemplary process for communicating user transaction data across different channels via a cross-channel real time awareness framework in an enterprise network.

FIG. 4 is a flowchart of an example process 400 for communicating user transaction data across different channels via a centralized user interaction framework or subsystem of an enterprise network. For purposes of this example and the discussion below, process 400 will be described in the context of network environment 100 of FIG. 1 and enterprise environment 200 of FIG. 2, as described above. However, process 400 is not intended to be limited thereto. Also, for purposes of this example, process 400 will be described in the context of a user's interactions related to a self-service transaction initiated by the user via an interface of one channel (e.g., Web channel) of an enterprise organization that may be shared with various other channels (e.g., IVR, Call Center, Retail Store, etc.) of the enterprise.

In the example shown in FIG. 4, process 400 begin in step 402, which includes receiving transaction data captured via the interface based on user activity for a transaction initiated by the user in the first channel. While the transaction in this example may be described as a self-service transaction initiated through an automated interface of an interactive enterprise channel, the techniques described herein are not limited thereto. The techniques described herein are therefore applicable to transactions initiated by the user in channels where the service interface of the enterprise channel is, for example, a customer support representative at a call center.

An example of an automated interface for a Web channel may include one or more web pages or frames including interactive user interface elements presented to the user (e.g., user 210 of FIG. 2) via the user's web browser (e.g., web browser 225 of FIG. 2), as described above. The automated interface may be, for example, a web interface including various user interface control elements accessible via a web page loaded within the user's browser. The web interface may be presented to the user via the web page along with online content related to particular products or services offered by the enterprise. The web server providing the automated interface in this example sends relevant content to the user's device for a new transaction initiated by the user. The relevant content sent by the web server may include, for example and without limitation, multiple web pages or frames with interactive content for display to, for example, a display screen of the user's device.

In an example, each web page or frame corresponds to a different step of a multi-step transaction (e.g., as described above with respect to the example shown in FIG. 3). Accordingly, the user may initiate a transaction by manipulating the various control elements of the automated web interface in order to browse information pertaining to a particular product or service provided by the enterprise and initiate a transaction related to that particular product or service. In this example, the user's device (e.g., user device 220 of FIG. 2, as described above) may send to an associated application or web server (e.g., web server 240 of FIG. 2) transaction data based on the user's interactions with the automated web interface. Further, the transaction data related to such user interactions may be used identify the particular actions performed by the user towards possible completion of the initiated transaction within the enterprise channel. As such, the identified user actions may be used to determine a completion status of this transaction, which can be assigned to the captured transaction data from the channel and stored with the transaction data for the user in, for example, a centralized database of the enterprise. As will be described in further detail below, the captured transaction data received at the web server of the Web channel may be sent to, for example, a centralized user interaction subsystem including the centralized database in the enterprise network for enabling the cross-channel real-time awareness framework described herein.

The transaction data captured for the user may be based on various actions taken by the user that are associated with the above-noted automated web interface. Examples of such user actions may include, but are not limited to, navigating between different web pages or frames provided for the interface, selecting various interactive elements presented to the user on each page, and entering text or other data into user fields provided on a page. As described above, portions of each page or the interactive elements embedded within the web interface may be encoded with specialized tags for tracking the user's actions with respect to each page via the web interface.

Once the transaction data captured for the user is received (e.g., at web server 240) in step 402, process 400 proceeds to step 404, which includes estimating a user interest level for the transaction based on the transaction data for the user. As described above, the transaction data may be captured by detecting the user's interaction with an interface (e.g., user's selection, via a user input device, of various interactive elements of the interface) provided by a channel of the enterprise. Further, weights may be assigned to the pages browsed by the user for each transaction. These page weights may be used to determine how far along the user was on a path to completing a multi-step transaction (e.g., for goods or services offered by the enterprise). The user's progression along such a transaction path may indicate the user's level of interest in the transaction associated with the pages browsed. Generally, the further a user progresses along the path toward completing the transaction, the more interest the user has in completing that transaction. As such, pages corresponding to later steps in the path to completion may be assigned greater weight (e.g., ranked relatively higher) than other pages. In step 406, the captured transaction data is updated with the estimated interest level of the user in the transaction in question.

Process 400 then proceeds to step 408, which includes determining whether or not the estimated interest level of the user in completing the transaction based on the transaction data is sufficient enough to track the user's progress toward completion for the particular transaction. In some implementations, a predetermined threshold interest level may be used for making such a determination. Referring to the web interface example above, the determination in step 408 may be based on, for example, the number of web pages accessed by the user for a multi-step transaction involving multiple pages, as described above with respect to the example shown in FIG. 3. This determination may also be based on, for example, the amount of user activity detected with respect to the automated interface or length of time that the user spends actively viewing or interacting with the interface (e.g., with respect to one or more pages of a multi-page transaction). Additionally or alternatively, this determination may be based on the type of transaction initiated by the user relative to prior transactions that the user is known to have initiated in other channels of the enterprise network environment, as will be described in further detail below.

In a further example, the determination in step 408 also may be based on the type of transaction-related content accessed by the user via the automated interface. The determination in this example may be based on various factors including, but not limited to, the complexity or amount of content accessed by the user in addition to the level of user interaction required to access such content. For example, the content accessed by the user may include one or more web pages having user fields that can be modified dynamically based on user input vs. static web pages presenting only text or images for display to the user, e.g., for informational purposes and without any user input that is possible. The estimated user interest level may not reach a sufficient level (e.g., rise above a predetermined threshold) when, for example, the user accesses only the first web page of a multi-page interface for a multi-step transaction or browses multiple pages of the interface but only spends a relatively short duration (e.g., a few seconds) on each page. It should be noted that steps 408 and 410 may be optional steps. For example, steps 408 and 410 may performed by a system in the enterprise environment (e.g., web server 240 and database 245 in enterprise environment 200 of FIG. 2, as described above) for purposes of making an initial determination as to whether or not the transaction data should be tracked or stored in the centralized database. As any captured transaction data that is determined not to be of a sufficient level is discarded in step 410, resources of the enterprise (e.g., in the centralized user interaction subsystem) may be conserved and reallocated for tracking transaction data for other transactions imitated by the user for which the user has shown some level of interest, e.g., above a predetermined threshold.

Assuming the estimated user interest level is sufficient (e.g., above the predetermined threshold interest level and before the transaction data is stored for the user (in step 416, discussed below), process 400 proceeds to 412, which includes determining whether or not the user can be identified, e.g., by the centralized user interaction subsystem described herein, as a known user for whom prior transaction data is stored in the enterprise environment. The determination in step 412 will be described below with reference to the example illustrated in FIG. 5.

Figure 5:
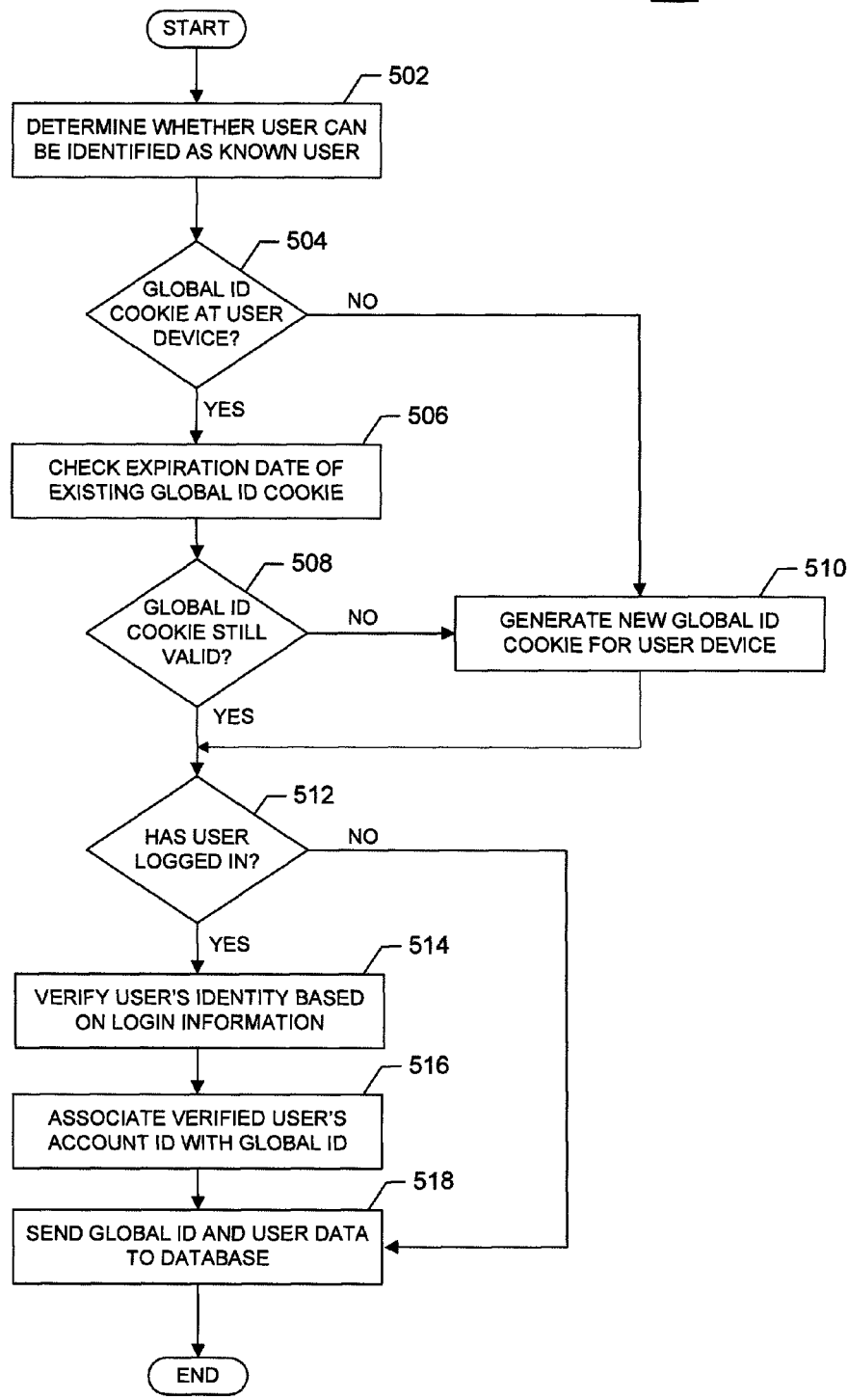
FIG. 5 is a flowchart of an exemplary process for identifying a user based on a unique global identifier assigned to the user in the enterprise environment.

FIG. 5 is a flowchart of an exemplary process 500 for identifying a user or determining whether the user can be identified by the centralized user interaction subsystem for cross-channel awareness of user-initiated transactions by sharing transaction data associated with the user across different channels of the enterprise. The identity of the user may be determined based on, for example, an account identifier associated with the user's subscriber account for services provided by the enterprise. The user's account may have been activated or registered previously by the user either in the same channel or a different channel of the enterprise. The account identifier may be, for example, a telephone number, an authentication token based on a username and password, pin number, or other unique number that identifies the particular user or user account. For example, the user (or the user's device) may provide the account identifier via the automated interface (e.g., username and password fields on a login page) in the channel. Like process 400, for purposes of discussion, the steps of process 500 will be described in the context of an automated interface of a Web channel of the enterprise, but process 500 is not intended to be limited thereto. The account identifier may be stored at the user's device in, for example, a cookie file stored for a web browser executable at the user's device and used by the user to access the automated interface via, e.g., a web page loaded within the browser, as described above.

Additionally or alternatively, the user may be identified using a global identifier (ID) for identifying the user's browser or device from which the captured transaction data is received. Further, the global ID may be a unique numeric identifier for tracking the user and the user's actions across different channels of the enterprise. The global ID may be stored at the user's device (e.g., in a cookie file associated with the user's web browser) and/or in a database or centralized data repository in the enterprise environment. As such, the global ID may be used to identify the user for subsequent transactions initiated by the user (or other user at the same browser or device) in any of the various channels of the enterprise. Additionally, the global ID may include an expiration date, which can be used to specify some length of time (e.g., one year) during which a global ID remains valid for identifying a user's self-service transactions.

As shown in FIG. 5, process 500 begins in step 502, which includes determining whether the user can be identified as a known user in the enterprise. For example, the user may have previously initiated a self-service transaction for goods and services via an automated service interface of the Web retail channel of the enterprise, as described above. Further, the transaction request in this example may be a subsequent transaction initiated by the same user in a different channel of the enterprise. As will be described in further detail below, the global ID associated with the particular user enables the enterprise environment to adapt the user interface presented to the user for self-service transactions in the one or more interactive channels of the enterprise providing an automated interface for self-service transactions. For example, the user interface may be adapted or customized for the particular user, the type of transaction or the user interface of a particular enterprise channel.

In step 504, it is determined whether a global ID is stored at the user's device. As noted above, the global ID may be included within a browser cookie file (or "cookie") stored at the user's device. Step 504 may involve the automated interface using, for example, an API function of the web browser to identify the location and contents of any such browser cookie stored at the user's device. For example, such a cookie would be missing if this is the first time the user is initiating a self-service transaction or a previously stored cookie tile has been deleted manually by the user or automatically as a function of the user's browser. If a global ID cookie cannot be found by the automated interface at the user's device, process 500 proceeds directly to step 510, in which a new global ID cookie is generated for the user. The generated global ID cookie can then be stored at the user's device and in a centralized database or a data warehouse of the enterprise environment in order to identify the user for subsequent self-service transactions, as described above. Otherwise, if a global ID is present at the user's device, process 500 proceeds to steps 506 and 508, in which the expiration date of the global ID cookie is checked to determine whether the cookie is still valid. If the cookie has expired and is therefore no longer valid, a new global ID cookie with a new expiration date can be generated in step 510.

In step 512, it is determined whether the user has logged in to the enterprise system by providing login credentials associated with the user's account. If the user has provided login credentials, the user's identity can be verified in step 514 and the enterprise system can associate the global ID with the user's previously stored account information in the enterprise system. In step 516, the global ID may be associated with an account ID associated with the user. In step 518, the associated global ID and account ID can then be stored within, for example, a global ID cookie file at the user's device and/or internally within the data warehouse of the enterprise environment. Accordingly, the particular user and other relevant information (e.g., one or more attributes) that may be associated with the user's account can be utilized for subsequent self-service transactions. Thus, a different global ID can be generated for each user of a device being shared amongst multiple users, as noted above. For example, each global ID and account ID for each of the users in such a shared use scenario may be stored in a separate global ID cookie file that can be stored at the device. Alternatively, separate global ID and account ID pairings for each user may be stored in a single file at the device and compared against subscriber or account information supplied by each user. The account information may include, for example, login or username and password information received from the user when, for example, the user accesses (or logs into) a web page through which the automated interface is provided and initiates a new self-service transaction.

Referring back to FIG. 4, if the user's identity is determined to be unknown (e.g., the global ID and user account ID are unavailable) in step 412, process 400 proceeds to step 414, in which the transaction data is stored for the user using a newly generated global ID. Otherwise, process 400 proceeds to step 416, in which the transaction data is stored for the identified user in association with an existing identifier associated with the user, e.g., at the user device and/or in the centralized user interaction subsystem for identifying the user across the various interactive channels of the enterprise. For example, if the user's account ID is available and a global ID has been previously generated for the user, the transaction data may be stored in association with both the account ID and the global ID (e.g., either an existing global ID that was previously generated or a newly generated global ID) at the user's device and within the centralized database of the enterprise environment.

Step 418 includes enabling the cross-channel real time awareness framework for purposes of sharing the stored transaction data for the user between the various channels of the enterprise, as described above. Step 418 may include, for example, activating a service or transaction data feed hosted at a server of the centralized user interaction subsystem including the centralized data warehouse or database for storing transaction data within the enterprise environment, as described above. The activated service may then be used by different user interaction systems (e.g., ACSS, IVR, Web interface, etc.) corresponding to the various user interaction channels of the enterprise network environment. For example, the global ID and/or user account ID may be used as the input parameter(s) for tracking and sharing transaction data associated with the user across the different channels (steps 424 and 426). However, the stored transaction data may be maintained for a limited period of time in order to conserve storage space in the enterprise environment and to ensure that the stored data remains relevant for subsequent transactions, as previously noted. Thus, steps 420 and 422 include determining whether the stored transaction data is still valid, for example, by checking whether a predetermined time limit has elapsed, after which the stored data is discarded. Such a predetermined time limit may be varied periodically depending on, for example, the current business needs or observed operating trends of a commercial enterprise (e.g., new product launch or volume of user transactions). Thus, the transaction data that is stored for the user may correspond to user actions in a channel that have occurred only during the predetermined time window (e.g., within the past 72 hours). If stored transaction data for the user is available, it may be sent in step 426 from the first channel (or central data warehouse) to the second channel (and/or one or more other channels) of the enterprise via the above-described service interface activated in step 418. For example, the transaction data may include user actions accumulated from multiple channels of the enterprise, which may be shared between channels as a cumulative set or summation of all user actions.

In an example, an enterprise system associated with the first channel may activate a data service that another enterprise system associated with the second channel may use to retrieve any transaction data stored for the particular user (e.g., when the user sends a communication request via an interface provided by the second system for the user in the second channel). The second channel and other channels of the enterprise may then use the stored transaction data sent in step 426 to generate a template of action or modified interactive process flow for interacting with the user based on the accumulated data. The template of action or interactive process flow may be implemented through a user interface provided by a system of the enterprise environment associated with the each of the respective channels, as described above. Also, the template of action may be specific to the user and thus based on transaction data accumulated for the individual user. Alternatively or additionally, the template of action may be for segments or categories of users based on collective data accumulated from a number of different enterprise users. In addition, the template of action may be customized for each channel, e.g., based on the type of user interface or types of products or services provided in the channel.

As described previously, metrics may be captured and shared in real time across channels of the enterprise. This information also may be used to generate a modified or customized user interface based on the user activities in one or more channels. Further, the shared metrics may provide the enterprise potential up-sell opportunities related to particular goods or services offered by the enterprise. As the stored metrics and user transaction data can be linked to particular users (e.g., using global IDs and/or account IDs, as described above), the enterprise can use this information to target goods and services offered by the enterprise (including advertisements for these goods and services) to particular users or groups of users across multiple channels of the enterprise.

Figure 6:
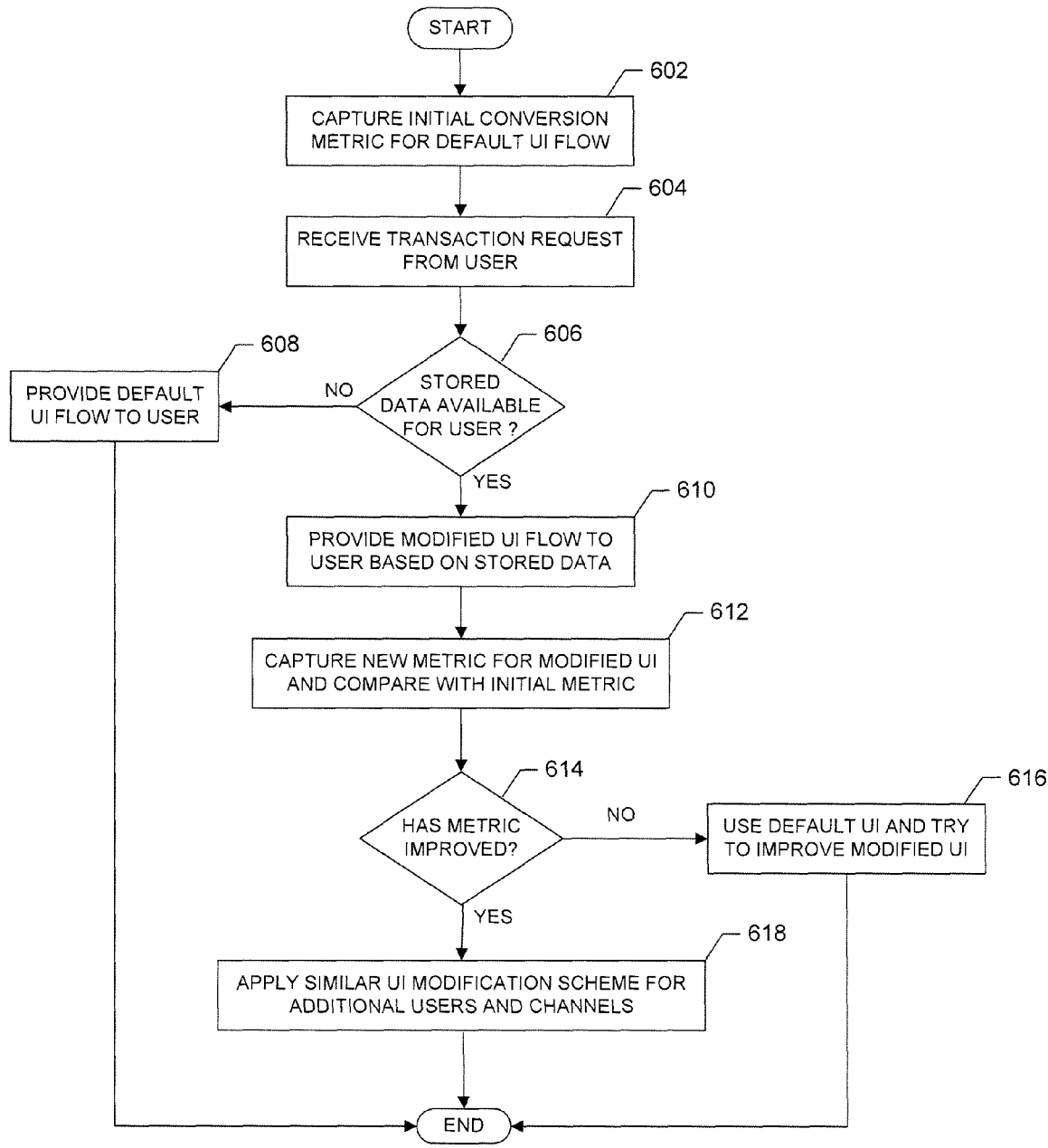
FIG. 6 is a flowchart of an exemplary process for capturing user interface metrics based on user interactions with different interfaces of an customer interaction channel of an enterprise network.

FIG. 6 is a flowchart of an exemplary process 600 for monitoring and improving production metrics based on a modified user interface based on transaction data corresponding to a user's actions within one or more channels of the enterprise, as described above. For example, the user's interactions with an interface provided by a channel may be represented by activity IDs captured via the interface (e.g., using specialized tags encoded within elements of a web interface for a Web channel, as described above). Also, a customized user interface may be created based on various characteristics associated with the user's activities in each channel.

Further, the captured transaction data based on the user's interactions with the interface of the channel may indicate the user's interests with respect to a particular product or service offered by the enterprise. In an example, transaction data stored for the user may be for a user-initiated transaction related to mobile or wireless communication services or additional services or add-on features for services already provided to the user, as discussed above with respect to the example multi-step transaction illustrated in FIG. 3. The additional services may include, for example, international wireless service plans or international service plans for making calls to users located overseas. In some implementations, the centralized user interaction subsystem customizes stored transaction data based on the particular user interface of the channel with respect to subsequent transactions initiated by the user, e.g., transactions initiated by the user in either the same or different channel. Additionally, the stored transaction data received from the centralized user interaction subsystem may be used to customize the interface of the customer interaction channel itself. For example, using the above wireless services example, the interface of the interactive channel may be modified to include additional purchase options for the user related to new mobile devices capable of operating on international wireless networks. The new devices may be offered for sale to the user in a customized list as part of a modified user process flow for the interface of the interactive channel. The list may be customized by, for example, including, or at least highlighting, only those mobile devices offered by the enterprise that are compatible with international mobile communication networks or telecommunication standards generally associated with international service providers.

Thus, the enterprise can provide a default user interface for most users but a customized user interface for the particular user based on the user's prior interactions with one or more interactive channels of the enterprise. In an example, the effectiveness of a modified or customized user interface is determined by comparing different production metrics based on transaction data captured for a user with respect to a default or standard user interface relative to a modified user interface customized based on the user's interactions with the default interface over a relevant period of time. These metrics can be used to make various improvements to the user interface or user experience for a transaction in a channel of the enterprise. It is noted that such modifications or improvements to the user interface or user experience for a channel are not limited to front-end user interface (UI) modifications and may include any new or modified back-end process or operation for a system in the enterprise that is associated with a self-service transaction. In a particular example, such a modification may include automatically sending, to the user's mobile device, a text or multimedia message including a confirmation of a completed transaction in any channel of the enterprise. For example, the improvements may be implemented in an iterative fashion to further improve user experience and also, to increase the likelihood of a desired outcome related to the business needs or goals of the enterprise.

As shown in FIG. 6, in step 602 of process 600, an initial metric associated with the original user interface in production is captured. When a transaction request is received from the user to initiate a self-service transaction via the user interface for a channel of the enterprise (step 604), it is determined whether stored transaction data is available for the user (step 606). For example, step 606 may include determining whether a global ID cookie is available at the user's device, as described above. If stored data is not available for the user (e.g., a valid global ID is not available at the user device), the default user interface (UI) or default process flow associated with a user experience in the channel is presented to the user in step 608. Otherwise, a modified user experience including a modified UI may be presented to the user for the self-service transaction in step 610. The modified UI and/or modified process flow for a modified user experience are used for at least the current session of the self-service transaction in place of the original or default user interface used previously.

Assuming a valid global ID is available for the current transaction, the usage and effectiveness of the modified user interface are tested in steps 612 and 614. As described above, the effectiveness of the modified user interface may be tested by capturing a new metric associated with this new interface in production (step 612) and comparing this metric with the initial metric (step 614), which was captured earlier in step 602. Step 614 includes determining whether the metrics associated with a modified UI/user experience process flow have improved over previous metrics associated with prior versions of the user interface/user experience process flow. If the metrics have improved from prior versions, then the updated UI/user experience process flow may be implemented on a permanent basis for one or more of the channels of the enterprise as appropriate (step 618). However, if no improvement has been identified, the enterprise can switch back to a prior or default version of the UI/user experience process flow and not allocate any further resources for the updated UI/user experience process flow (step 616).

A production metric that may be used to test the relative effectiveness of a modified user interface (e.g., web page) or modified back end process (e.g. sending email confirmation of transaction) may include, for example and without limitation, a conversion rate representing the number of times (or number of users) that a previously abandoned transaction is later completed successfully following the introduction of a modified user interface/experience. Other examples of metrics that can be used may include, but are not limited to, the number of times a user views or visits a web page, e.g., associated with a user interface of a self-service transaction of a web retail channel, the length of time spent for each visit, the number of different users who visit the page, and other types of information related to the amount of web traffic that the page receives during some period of time. It should be noted that any one of various well-known third-party commercial solutions may be used as desired in the enterprise environment for monitoring and capturing such metric data. For example, metrics corresponding to the web traffic for a web site of a web or online interactive channel can be used to optimize the web site based on the business goals of the enterprise. Such business goals may include, for example, increasing visits to a page, selling more products or product accessories, or promoting certain kinds of self-service transactions.

In an example, one or more conversion paths may be identified based on these metrics. The conversion paths may be designed to increase the probability for attaining a successful conversion event (e.g., conversion of user action from abandonment to successful completion of the transaction). In addition, a change plan may be implemented based on such a conversion path, for example, in a web channel. In a further example, the different conversion paths that have been identified can be analyzed to make relative comparisons in regard to the effectiveness of each path. For example, a path analysis report may be generated for each conversion path based on captured production metrics. Each report may show, for example, the number of users who abandoned the self-service transaction and the particular point at which it was abandoned.

Figure 7:
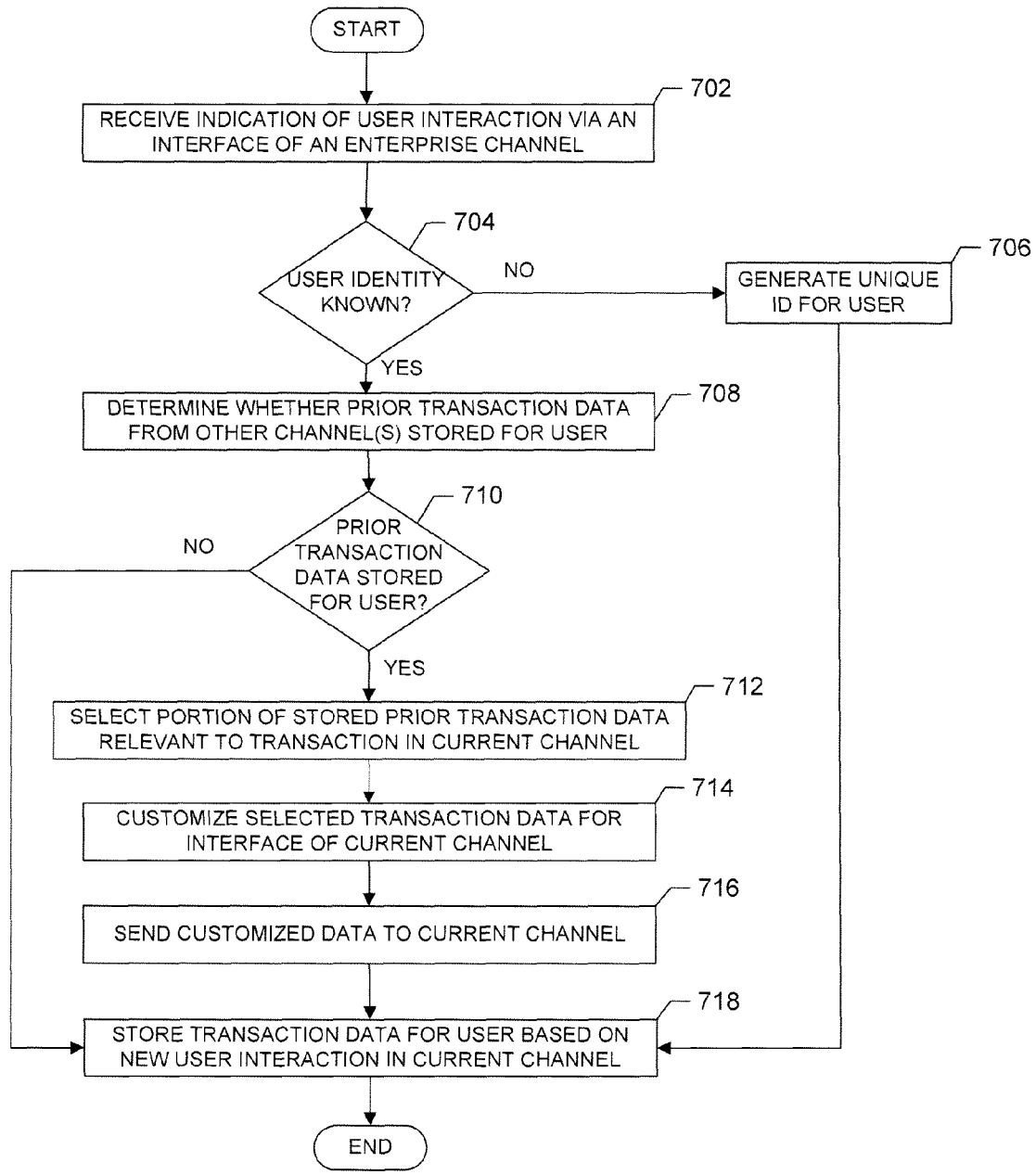
FIG. 7 is a flowchart of an exemplary process for sending a selected portion of stored prior transaction data based on the relevance of the stored data to a new user interaction initiated via an interface of a channel of the enterprise.

FIG. 7 is a flowchart of an exemplary process 700 for customizing a selected portion of stored prior transaction data from one channel that is determined to be relevant to a new user transaction initiated via an interface of a different channel of the enterprise. For purposes of discussion, process 700 will be described in the context of enterprise network environment 100 and enterprise environment 200 of FIGS. 1 and 2, respectively, as described above. Thus, the steps of process 700 may be performed by, for example, a server in the centralized user interface subsystem of enterprise network environment 100 of FIG. 1, as described above. However, process 700 is not intended to be limited thereto. As described previously, the centralized user interface subsystem enables real-time sharing of prior transaction data for users across the different channels of the enterprise, e.g., based on one or more prior transactions initiated by the user in a channel of the enterprise. Process 700 will be described in the context of a self-service transaction initiated by the user via an interface of a channel (e.g., Web channel) of the enterprise, and sharing transaction data related to the self-service transaction with one or more other channels (e.g., IVR, Call Center, Retail Store, etc.) of the enterprise.

As shown in the example of FIG. 7, process 700 begins in step 702, which includes receiving an indication of a new user interaction. For example, a new user interaction received via an interface of a channel of the enterprise may trigger a notification indicating the new user interaction to a server of the centralized user interaction subsystem of the enterprise network. Process 700 then proceeds to step 704, which includes determining whether or not the user's identity is known to the centralized user interaction subsystem. Step 704 may include determining, for example, whether a global ID is associated with the user or user's device. In an example, the notification from the server of the enterprise channel includes a mobile device identifier (e.g., MDN) associated with the user's device. The mobile device identifier may be used to query the centralized database of the subsystem to find the global ID associated with the user.

As described above, the global ID may be valid for only a predetermined period of time, after which the global ID and any transaction data associated with the global ID are deleted from the centralized database. In this way, only relatively recent transaction data is stored for the user so as to increase the likelihood that any stored prior transaction data remains relevant for any new transactions initiated by the user. Thus, if a global ID cannot be found for the user in step 704, process 700 proceeds to step 706, in which a new unique global ID is generated for the user and process 700 proceeds directly to step 714, discussed further below.

In steps 708 and 710, a determination of whether or not prior transaction data for the user is within the centralized database of the central user interaction subsystem of the enterprise. If it is determined that no prior transaction data is stored for the user, then process 700 proceeds directly to step 714. Since a global ID is generated for purposes of tracking user interactions across various channels by storing transaction data for the user within the centralized database, step 708 may be, for example, an optional step and only step 704 may be necessary. If it is determined in steps 708 and 710 that prior transaction data is stored for the user, process 700 proceeds to step 712, which includes selecting a portion of the stored prior transaction data that is relevant to the user's interaction with the interface of the current channel. The stored prior transaction data may be based on, for example, the user's prior interactions with interfaces of one or more other enterprise channels. Further, the stored prior transaction data may correspond to either the same or a different transaction initiated by the user in a different channel of the enterprise. Accordingly, step 712 may include determining whether or not the new user interaction in the current channel is for the same transaction or a new transaction initiated by the user. If the new user interaction is for the same transaction, all of the stored prior transaction data is sent to the current channel. However, the user may have, for example, initiated multiple transactions in one or more different channels of the enterprise and the stored prior transaction data therefore may correspond to multiple transactions. Thus, in the case of stored transaction data for multiple transactions, step 712 would include identifying the portion of the stored transaction data that is relevant to the transaction corresponding to the new user interaction in the current channel. In a different example, if the new transaction is determined to be for a new transaction, step 712 may further include determining whether the new transaction is of the same type of transaction as the stored prior transaction data. In this example, step 712 includes identifying one or more portions of the stored prior transaction data corresponding to different transactions of the same type as the new transaction initiated in the current channel. As such, the selected portion of the stored prior transaction data includes transaction data from multiple transactions of the same type as the new transaction.

In some implementations, a relevancy mapping between different types of user transactions and each of the various interactive channels of the enterprise is maintained. Such a relevancy mapping may be stored in, for example, a database of the above-described centralized subsystem of the enterprise network environment. Such a relevancy mapping may be used to determine whether a particular transaction initiated by a user in a channel is relevant to that particular channel and to other transactions that may have been previously initiated by the same user either in the same or different channel of the enterprise. The relevancy mapping stored for a particular channel may also include separate lists of transactions that are considered relevant for purposes of storing new transaction data (e.g., for "save" requests to the centralized subsystem) or for requesting previously stored transaction data (e.g., for "retrieval" requests to the subsystem). In an example, step 712 may further include querying the database of the centralized subsystem in order to determine whether the type of transaction initiated by the user in the current channel is mapped to a prior transaction previously initiated by the same user, which would indicate that the new transaction is relevant. If a relevancy mapping between the new transaction and another prior transaction is defined within the database, stored data for the prior transaction may be retrieved from the centralized subsystem for processing the new transaction in the current channel. Further, the format and type of the retrieved transaction data may be translated, e.g., from a common cross-channel data format, as will be described in further detail below, to a format and type that is used by the current channel.

In step 714, the selected portion of the prior transaction data is sent to the current channel (e.g., to a server of an enterprise system associated with the current channel). Process 700 then proceeds to step 716, which includes customizing the selected transaction data for the interface of the current channel of the enterprise. In some implementations, the prior transaction data is stored in a common data format used by the centralized user interaction subsystem, which may not be specific to the system or interface of any one particular enterprise channel. Further, as described previously, the systems or user interfaces associated with different channels of the enterprise may require different data formats. Accordingly, step 716 may include, for example, converting the selected portion of the prior transaction data from a common data format of the centralized subsystem to a data format associated with the current enterprise channel or user interface thereof.

In step 718, transaction data based on the new user interaction with the interface of the current channel is stored in the centralized database. For example, the notification indicating the new user interaction received from the channel of the enterprise in step 702 may also include transaction data captured based on the user's interactions with the interface of the user interaction channel. As described above, in some implementations, the transaction data stored within the centralized database is stored in a common data format for cross-channel communications. Therefore, step 718 may include, for example, converting the transaction data from the current channel to the common data format.

The data format and type associated with each transaction may be defined for each enterprise channel using a schema or markup language, for example, extensible markup language (XML) schema. For example, an XML schema defined for a particular type of transaction (e.g., a change order for an account feature) in a customer service channel of the enterprise may include elements specifying various data fields including, but not limited to, the unique global ID assigned to the user, the billing account number, and effective date of the order. However, it should be noted that the techniques described herein are not limited to XML schemas and that the any of various types of data formats may be used instead. A similar schema (e.g., a different XML schema) may be used to define the common cross-channel data format and type of each transaction for the centralized subsystem of the enterprise network environment. Thus, in addition to the schema for the common cross-channel transaction data format, a database of the centralized subsystem may be used to store the various XML schemas associated with each of the respective channels of the enterprise. Accordingly, the appropriate schema is selected and used by the centralized subsystem to translate transaction data from a format and type associated with a particular enterprise channel to the common cross-channel format and type prior to being stored in the centralized subsystem database or translate previously stored transaction data from the common cross-channel format and type prior to being sent to a particular enterprise channel.

Figure 8:
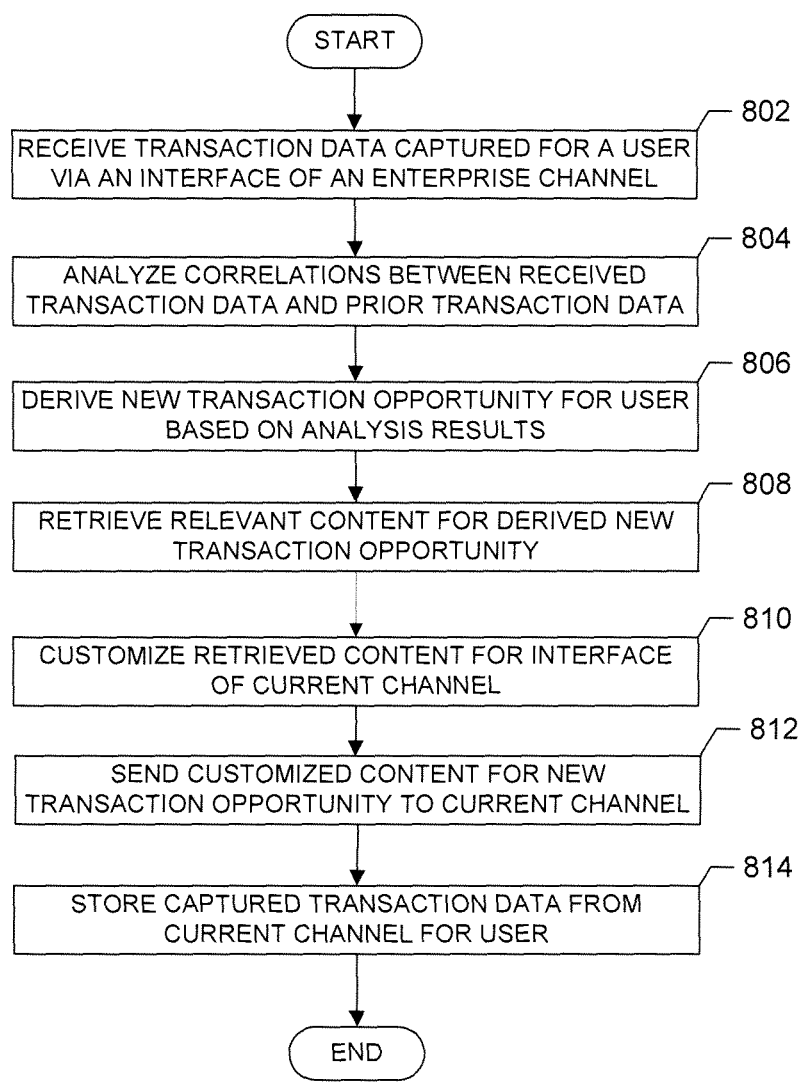
FIG. 8 is a flowchart of an exemplary process for deriving new transaction opportunities for a user initiating a new transaction via an interface of a channel of the enterprise based on prior transaction data stored for the user.

FIG. 8 is a flowchart of an exemplary process 800 for deriving new transaction opportunities for a user initiating a new transaction via an interface of a channel of the enterprise based on prior transaction data stored for the user. For purposes of discussion, process 800 will be described in the context of enterprise network environment 100 and enterprise environment 200 of FIGS. 1 and 2, respectively, as described above. Therefore, the steps of process 800 may be performed by, for example, a server in the centralized user interface subsystem of enterprise network environment 100 of FIG. 1, as described above. However, process 800 is not intended to be limited thereto.

Process 800 begins in step 802, which includes receiving transaction data captured for a user via an interface of an enterprise channel. While not shown in FIG. 8, process 800 may include additional steps for determining the identity of the user based on a global ID associated with the user in the centralized user interaction subsystem of the enterprise, as described above with respect to steps 704, 706, 708 and 710 of process 700 of FIG. 7. However, these additional steps are excluded for process 800 for ease of discussion. Also, for ease of discussion, it is assumed that the prior transaction data is stored for the user within a database of the centralized subsystem.

Process 800 then proceeds to step 804, which includes analyzing correlations between the received transaction data and stored prior transaction data for the user. Step 804 includes comparing the transaction data captured in the current enterprise channel with the stored prior transaction data. In step 806, a new potential transaction (or up-sell) opportunity is derived based on the results of the analysis performed in step 804. In some implementations, new transaction opportunities are derived based on a predetermined mapping of predefined transaction opportunities to specific user interactions that may be captured via an automated interface of an enterprise channel. In an example, the predetermined mapping is stored in a lookup table within a database of the centralized subsystem. Therefore, steps 804 and 806 may include identifying different user interactions from the transaction data captured in the current channel. In an example, a predefined user interaction may be associated with a specific control element of the user interface of the current channel. Further, the specific control element may be encoded with a unique identifier that can be used to identify the particular user interaction with the user interface of the current channel. Therefore, relevant user interactions may be tracked according to the unique identifiers associated with particular control elements of the user interface that may be of interest for potential new transaction opportunities that may be provided to the user via the interface of the enterprise channel. The user interactions may be stored in association with the appropriate unique identifiers for the mapping stored in the above-described lookup table. These user interactions may then be compared with the prior transactions initiated by the user (e.g., in the same or different channel of the enterprise) based on the stored prior transaction data associated with the user in order to identify new transaction opportunities for the user.

Using the online trip planner example of FIG. 3, described above, prior transaction data may be stored for the user with respect to a recent transaction related to a particular international wireless service plan offered by the wireless carrier to subscribers traveling overseas. The recent transaction may have been initiated by the user in a different channel (e.g., Web channel) of the enterprise but not completed in that channel. In the current channel of the enterprise, the transaction data captured via the interface of the current channel (e.g., IVR channel) may be related to, for example, new mobile devices also offered by the wireless carrier. Accordingly, a new transaction or up-sell opportunity that may be derived for the user based on the prior transaction data and the transaction data captured in the current channel may include, for example, a transaction for a new mobile device compatible with international wireless networks.

Once a new transaction opportunity has been derived, process 800 proceeds to step 808, which includes retrieving relevant content for the derived new transaction opportunity. Such relevant content may be stored, for example, in a separate table within the centralized database along with the look up table including the mapping of potential new transaction opportunities that may be derived, as described above. In step 810, the content is customized for the particular interface of the current enterprise channel, and in step 812, the customized content is sent to a server of the current channel. Step 814 includes storing the transaction data captured in the current channel by updating the prior transaction data already stored within the centralized database, which may be used to derived new transaction opportunities for subsequent user interactions with any of the channels of the enterprise.

Figure 9:
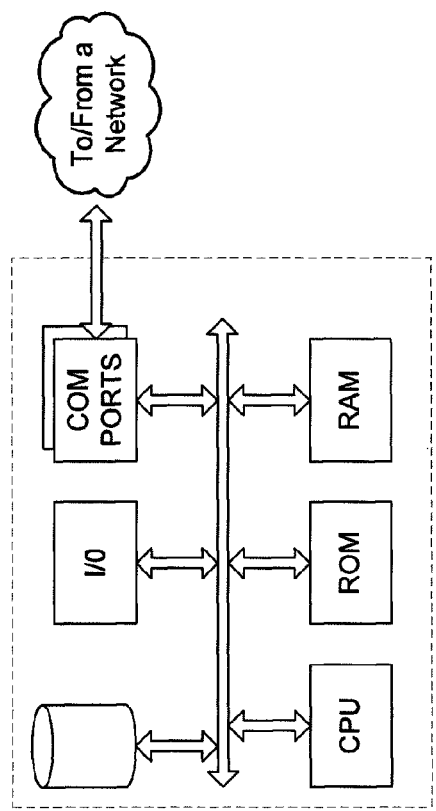
FIG. 9 is a simplified functional block diagram of an example computer that may be configured to host a self-service transaction, for example, to function as a server in the system of FIG. 1.
Figure 10:
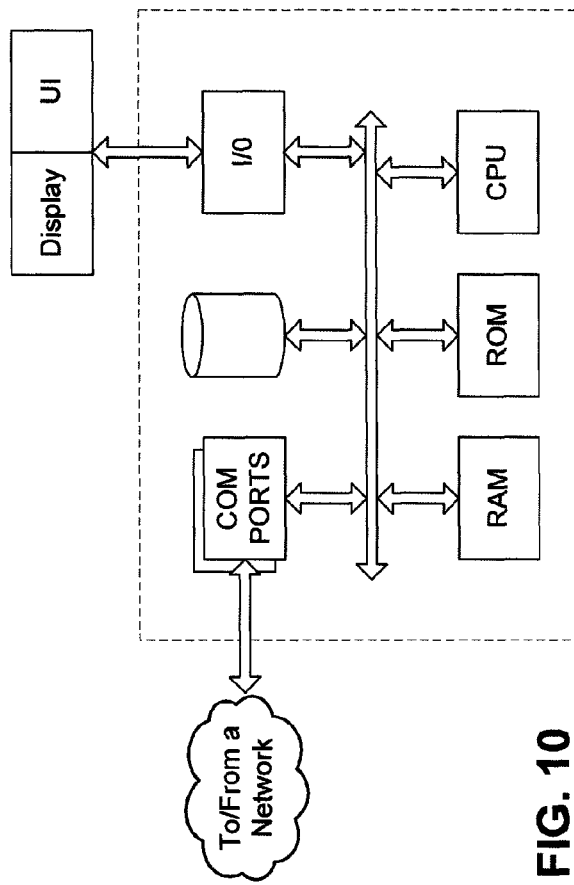
FIG. 10 is a simplified functional block diagram of an example personal computer or other user device.

FIGS. 9 and 10 provide functional block diagram illustrations of general purpose computer hardware platforms. FIG. 9 illustrates a network or host computer platform, as may typically be used to implement a server (e.g., servers 140, 150, 160 and 170 and their respective databases 145, 155, 165 and 175 of FIG. 1 in addition to servers 240 and 250 along with databases 245 and 255 of FIG. 2, as described above). FIG. 10 depicts a computer with user interface elements, as may be used to implement a personal computer or mobile device (e.g., devices 110 or 120 of FIG. 1 and user device 220 of FIG. 2, as described above). It is believed that the structure, programming and general operation of such computer equipment is well-known in the relevant art given this description and as a result, the examples illustrated in FIGS. 7 and 8 should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that such components are generally well-known in the relevant art given the description herein. Of course, the server functions may be implemented in a distributed fashion on a number of similar platforms, to distribute the processing load.

Hence, aspects of the methods of processes 400, 500, 600. 700 and 800 of FIGS. 4, 5, 6, 7 and 8, respectively, as described above, may be embodied in programming. Program aspects of the technology may be thought of as "products" or "articles of manufacture" typically in the form of executable code or process instructions and/or associated data that is stored on or embodied in a type of machine readable medium for use by the systems implementing the interactive user channels of an enterprise and associated cross-channel awareness framework as described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the enterprise environment into the computer platform of the enterprise server that will be hosting the user interface associated with an interactive channel.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer" or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the steps of processes 400, 500, 600, 700 and 800 of FIGS. 4, 5 6, 7 and 8, respectively, as described above. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As noted above, the computer as illustrated in the example of FIG. 10 may be a mobile computer with user interface elements, as may be used to implement a laptop, tablet or notebook computer or the like. For example, such a device may include a touch-screen display for user input and output. Alternatively, the device may include a standard light emitting diode (LED) display and, for example, an alpha-numeric keypad or T9 keyboard. The structure, programming, and general operation of such computing equipment are well-known and as a result, the drawing should be self-explanatory. As known in the data processing and communications arts, a mobile computer comprises a central processor or other processing device, an internal communication bus, various types of memory or storage media (RAM, ROM, EEPROM, cache memory, disk drives, etc.) for code and data storage, and one or more network interface cards or ports for communication purposes. Also, the mobile computer can further comprise various wireless transceiver modules (or components) such as GPS, WiFi, IrDA, Bluetooth, etc. The software functionalities involve programming, including executable code, associated stored data, and graphical user interface code for implementing a client application program at the mobile device. The software code is executable by the processor of the mobile computer. In operation, the code is stored within the mobile computer. At other times, however, the software may be stored at other locations and/or transported for loading into the appropriate mobile computer. Execution of such code by a processor of the mobile computer enables the mobile computer to implement the relevant steps of processes 400, 500, 600, 700 and 800 of FIGS. 4, 5, 6, 7 and 8, respectively, in essentially the manner performed in the implementation discussed and illustrated herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method, comprising:
   receiving, from a web channel of an enterprise, current transaction data for a current transaction initiated by a user via a graphical user interface of the web channel that is provided for display to the user, the enterprise having multiple channels, each channel providing the user with a different type of interface for accessing a service offered by the enterprise;
   identifying the user based on the received current transaction data;
   identifying, based on the identified user, prior transaction data that is stored within a centralized database of the enterprise and that corresponds to one or more prior transactions initiated by the user via an interface of an additional channel of the enterprise that includes one of an in-store retail channel, an interactive voice response channel, a call center channel, a live person chat channel, an automated kiosk channel, and an automated chat channel;

determining, based on the received current transaction data and the prior transaction data, that the current transaction is a continuation of a prior transaction included in the one or more prior transactions, the prior transaction initiated and not completed by the user via the interface of the additional channel of the enterprise;

selecting at least a portion of the prior transaction data that corresponds to the prior transaction initiated and not completed by the user via the interface of the additional channel of the enterprise;

converting the selected portion of the prior transaction data from a common data format within the centralized database that is not specific to any one channel included in the multiple channels of the enterprise to a data format that is specific to the web channel of the enterprise;

sending the selected portion of the prior transaction data that was converted from the common data format to the web channel for processing the current transaction for the user; and directing the web channel to adjust, based on the selected portion of the prior transaction data that corresponds to the prior transaction initiated and not completed by the user via the interface of the additional channel of the enterprise, the processing of the current transaction by continuing the prior transaction in the graphical user interface of the web channel that is provided for display to the user.

2. The method of claim 1, wherein the received current transaction data includes a unique identifier associated with the user, the unique identifier identifies the user across the multiple channels of the enterprise, and the method further comprises storing the received current transaction data in the centralized database in association with the prior transaction data stored for the user.

3. The method of claim 1, further comprising:
comparing the prior transaction data with the received current transaction data;
identifying correlations between the prior transaction data and the received current transaction data based on the comparison; and
directing the web channel to adjust the processing of the current transaction based on the identified correlations and the selected portion of the prior transaction data.

4. The method of claim 3, further comprising:
deriving a transaction opportunity for the user based on the identified correlations between the prior transaction data and the received current transaction data; and
directing the web channel to adjust the processing of the current transaction by providing the transaction opportunity to the user via the graphical user interface of the web channel.

5. The method of claim 3, wherein the graphical user interface of the web channel of the enterprise includes multiple control elements, each control element is encoded with a unique control element identifier, and the current transaction data received from the web channel includes at least one unique control element identifier associated with one of the multiple control elements of the graphical user interface of the web channel.

6. The method of claim 5, wherein the identifying of the correlations comprises:
identifying a user interaction based on the unique control element identifier included within the current transaction data, wherein unique control element identifiers included within the current transaction data received from the web channel of the enterprise track the user's interactions with one or more of the multiple control elements of the graphical user interface of the web channel.

7. The method of claim 1, wherein the prior transaction data includes a record of the user's interactions with the interface of the additional channel of the enterprise.

8. The method of claim 1, further comprising:
converting the current transaction data received from the web channel of the enterprise to the common data format associated with the centralized database; and
storing the converted current transaction data within the centralized database in the enterprise in association with a unique identifier assigned to the user.

9. The method of claim 1, further comprising directing the web channel to adjust the processing of the current transaction by providing an option, within the graphical user interface of the web channel, for the user to complete the prior transaction in the graphical user interface of the web channel.

10. The method of claim 1, wherein the determining that the current transaction is a continuation of the prior transaction initiated and not completed by the user via the interface of the additional channel of the enterprise comprises identifying that a completion status stored in the centralized database for the prior transaction indicates that the prior transaction is incomplete.

11. The method of claim 1, wherein the directing of the web channel to adjust the processing of the current transaction by continuing the prior transaction in the graphical user interface of the web channel of the enterprise comprises directing the web channel to present the selected portion of the prior transaction data that corresponds to the prior transaction initiated and not completed by the user via the interface of the additional channel of the enterprise to the user in the graphical user interface of the web channel.

12. The method of claim 1, further comprising:
converting the prior transaction data from a data format that is specific to the additional channel of the enterprise to the common data format that is not specific to any one channel included in the multiple channels of the enterprise; and
storing, after converting the prior transaction data to the common data format, the prior transaction data within the centralized database in the enterprise in association with a unique identifier assigned to the user.

13. The method of claim 1, wherein:
the common data format corresponds to a first extensible markup language (XML) schema; and
the data format that is specific to the web channel of the enterprise corresponds to a second XML schema different from the first XML schema.

14. A system, comprising:
a network communication device configured to exchange data communications through a communication network of an enterprise having multiple channels, the communication network including a centralized database accessible to the network communication device;
a processor coupled to the network communication device;
a storage device accessible to the processor; and
an application program in the storage device, the application program including a plurality of functions, wherein execution of the application program by the processor configures an application server to exchange data communications related to the plurality of functions with one or more client devices through the communication network, wherein the processor is configured to perform functions, including functions to:

receive, from a web channel of the enterprise, transaction data for a transaction initiated by a user via a graphical user interface of the web channel that is provided for display to the user, the enterprise having multiple channels, each channel providing the user with a different type of interface for accessing a service offered by the enterprise;

identify the user based on the received transaction data for the transaction initiated in the graphical user interface of the web channel;

identify, based on the identified user, prior transaction data that is stored within the centralized database and that corresponds to one or more prior transactions initiated by the user via an interface of an additional channel of the enterprise that includes one of an in-store retail channel, an interactive voice response channel, a call center channel, a live person chat channel, an automated kiosk channel, and an automated chat channel;

determine, based on the received transaction data for the transaction initiated in the interface of the web channel and the prior transaction data that corresponds to one or more prior transactions initiated in the interface of the additional channel, that the transaction is a continuation of a prior transaction included in the one or more prior transactions, the prior transaction initiated and not completed by the user via the interface of the additional channel of the enterprise;

select a portion of the prior transaction data that corresponds to the prior transaction initiated and not completed by the user via the interface of the additional channel of the enterprise;

convert the selected portion of the prior transaction data from a common data format within the centralized database that is not specific to any one channel included in the multiple channels of the enterprise to a data format that is specific to the web channel of the enterprise;

send the selected portion of the prior transaction data that was converted from the common data format to the web channel for processing the current transaction for the user; and direct the web channel to adjust, based on the selected portion of the prior transaction data that corresponds to the prior transaction initiated and not completed by the user via the interface of the additional channel of the enterprise, the processing of the transaction by continuing the prior transaction in the graphical user interface of the web channel that is provided for display to the user.

15. The system of claim 14, wherein the received transaction data includes a unique identifier associated with the user, and the unique identifier identifies the user across the multiple channels of the enterprise.

16. The system of claim 14, wherein the processor is further configured to perform functions to:

compare the prior transaction data with the transaction data received from the web channel of the enterprise;

identify correlations between the prior transaction data and the received transaction data from the web channel of the enterprise based on the comparison; and derive a transaction opportunity for the user based on the identified correlations.

17. The system of claim 16, wherein the graphical user interface of the web channel of the enterprise includes multiple control elements, each control element is encoded with a unique control element identifier, and the transaction data received from the web channel includes at least one unique control element identifier associated with one of the multiple control elements of the graphical user interface of the web channel.

18. The system of claim 17, wherein the function to identify correlations includes functions to:

identify a user interaction based on the unique control element identifier included within the transaction data, wherein unique control element identifiers included within the transaction data received from the web channel of the enterprise are used to track the user's interactions with one or more of the multiple control elements of the graphical user interface of the web channel.

19. The system of claim 14, wherein the prior transaction data includes a record of the user's interactions with the interface of the additional channel of the enterprise.

20. The system of claim 14, wherein the processor is further configured to perform functions to:

convert the transaction data received from the web channel of the enterprise to the common data format associated with the centralized database; and store the converted transaction data within the centralized database in the enterprise in association with a unique identifier assigned to the user.

\* \* \* \* \*